US010254855B2

(12) United States Patent
Lee

(10) Patent No.: US 10,254,855 B2
(45) Date of Patent: Apr. 9, 2019

(54) HIGH RESOLUTION AND HIGH SENSITIVITY THREE-DIMENSIONAL (3D) CURSOR MANEUVERING DEVICE

(71) Applicant: Wen-Chieh Geoffrey Lee, Taipei (TW)

(72) Inventor: Wen-Chieh Geoffrey Lee, Taipei (TW)

( * ) Notice: Subject to any disclaimer, the term of this patent is extended or adjusted under 35 U.S.C. 154(b) by 552 days.

(21) Appl. No.: 14/294,369

(22) Filed: Jun. 3, 2014

(65) Prior Publication Data

US 2014/0354548 A1 Dec. 4, 2014

Related U.S. Application Data

(60) Provisional application No. 61/830,834, filed on Jun. 4, 2013.

(51) Int. Cl.
*G06F 3/0346* (2013.01)
*G06F 3/0354* (2013.01)
*G06F 3/03* (2006.01)
*G06F 3/038* (2013.01)
(Continued)

(52) U.S. Cl.
CPC ............ *G06F 3/0346* (2013.01); *G06F 3/038* (2013.01); *G06F 3/0317* (2013.01); *G06F 3/0321* (2013.01); *G06F 3/03543* (2013.01); *G06F 3/042* (2013.01); *G06F 3/04815* (2013.01)

(58) Field of Classification Search
CPC ...... G06F 3/038; G06F 3/042; G06F 3/04815; G06F 3/03543; G06F 3/0321; G06F 3/0317; G06F 3/0346; G06F 3/0487
See application file for complete search history.

(56) References Cited

U.S. PATENT DOCUMENTS

| 4,835,528 A | 5/1989 | Flinchbaugh |
| 5,798,761 A | 8/1998 | Isaacs |

(Continued)

FOREIGN PATENT DOCUMENTS

| WO | WO 2006/137077 | 12/2006 | |
| WO | WO 2006137077 A1 * | 12/2006 | ........... G06F 3/0317 |

OTHER PUBLICATIONS

European Search Report, dated Feb. 27, 2015, EP 14 36 8025.

(Continued)

*Primary Examiner* — Mark Edwards
(74) *Attorney, Agent, or Firm* — Saile Ackerman LLC; Stephen B. Ackerman

(57) ABSTRACT

A three dimensional (3D) maneuvering device generates 3D data by irradiating a variably tinted two dimensional (2D) reference surface. The tri-stimuli color index data (e.g. CIE 1931 RGB) is a reliable and high definition source of such tinting. By mathematical conversion, the color index data on the 2D surface is mapped into 3D positional data, i.e. (x, y, z) to be used by a computer, a 3D rendering device or an electronic or electromechanical device such as a 3D printer. The 3D maneuvering device has high sensitivity, high resolution, and immunity from the noise caused by human vibrations. A rotational motion vector is derived by comparing the relative motion vectors derived from a pattern recognition process of surface features on the same reference plane with the positional data derived using the color index data. Thus, a single gestural movement of the operator's hand provides both the translational and rotational motion data simultaneously.

38 Claims, 18 Drawing Sheets

(51) Int. Cl.
*G06F 3/042* (2006.01)
*G06F 3/0481* (2013.01)

(56) References Cited

U.S. PATENT DOCUMENTS

| | | | |
|---|---|---|---|
| 6,078,312 A * | 6/2000 | Liebenow | G06F 3/0321 345/161 |
| 6,720,949 B1 | 4/2004 | Pryor et al. | |
| 6,844,871 B1 | 1/2005 | Hinckley et al. | |
| 7,646,377 B2 * | 1/2010 | Geaghan | G06F 3/0317 345/173 |
| 8,291,322 B2 | 10/2012 | Klappert et al. | |
| 8,553,235 B1 | 10/2013 | Lee | |
| 8,692,212 B1 * | 4/2014 | Craft | G06F 3/0317 250/458.1 |
| 2005/0094154 A1 * | 5/2005 | Baney | G06F 3/03544 356/499 |
| 2008/0036773 A1 | 2/2008 | Bae | |
| 2009/0079710 A1 * | 3/2009 | Lapstun | B41J 2/17503 345/179 |
| 2009/0262071 A1 * | 10/2009 | Yoshida | G01C 21/3614 345/157 |
| 2009/0319203 A1 * | 12/2009 | Kalliomaki | A61B 5/221 702/44 |
| 2010/0085471 A1 * | 4/2010 | Craven-Bartle | G06F 3/03545 348/371 |
| 2013/0002555 A1 | 1/2013 | Lee | |
| 2013/0211597 A1 * | 8/2013 | Sommerville | B25J 9/1602 700/264 |
| 2013/0241835 A1 | 9/2013 | Lee | |
| 2014/0076985 A1 * | 3/2014 | Pettersson | B05B 12/122 239/11 |

OTHER PUBLICATIONS

"Review of CMOS image sensor," by M. Bigas, et al., Microelectronics Journal 37, Sep. 6, 2005, pp. 433-451, www.elsevier.com/locate/mejo.

"CMOS Image Sensor for High Speed Applications," by Munir El-Desouki, et al., Sensors, Jan. 13, 2009, pp. 430-444, doi: 10.3390/s90100430, www.mdpi.com/journal/sensors, ISSN 1424-8220.

"TwistMouse for Simultaneous Translation and Rotation," by Jacqui Hannagan, A dissertation submitted for the partial fultulment of the requirements for the degree of Bachelor of Commerce (Honours), at the University of Otago, Dunedin, New Zealand, Nov. 14, 2007, pp. 1-117.

Co-pending U.S. Appl. No. 14/056,140, filed Oct. 17, 2013 by Wen-Chieh Geoffrey Lee, "Optical Mouse With Cursor Rotating Ability," 89 pgs.

* cited by examiner

HIGH RESOLUTION AND HIGH SENSITIVITY THREE-DIMENSIONAL (3D) CURSOR MANEUVERING DEVICE

RELATED APPLICATIONS

This application claims the benefit of U.S. Provisional Application Ser. No. 61/830,834, filed on Jun. 4, 2013, and herein incorporated by reference in its entirety.

This application is related to U.S. Pat. No. 9,733,727, herein incorporated by reference in its entirety; this application is also related to U.S. Pat. No. 10,120,460 herein incorporated by reference in its entirety; this application is also related U.S. Pat. No. 8,553,235 and to U.S. Pat. No. 9,720,525 herein incorporated by reference in its entirety.

BACKGROUND

1. Technical Field

The present disclosure relates to a maneuvering system to be used for controlling or facilitating three-dimensional motion of a real or graphically rendered object on a computer, on an electronic display or on other electronic or electro-mechanical devices.

2. Description

The conventional optical mouse, as illustrated schematically in FIG. 1, is a two-dimensional (2D) cursor maneuvering device. During its operation, the user moves the mouse (101) on a two-dimensional (2D) planar reference surface, such as a mouse pad or a desktop surface (104). By comparing a series of images of the surface captured by the mouse ((102) is an image sensor, (103) is a light source) as it moves along the reference plane, the mouse sends relative motion vectors to a remote computer or other graphical displaying device, whose display format is also a two dimensional one (105), i.e., the motion vector appears with components ($\Delta x$, $\Delta y$) on a screen. FIG. 1 schematically shows the generic structure of such a conventional art.

In recent years, three-dimensional (3D) displaying devices have become increasingly popular. They can be used by a computer, a 3D printer, a surgical simulator or a video gaming device. Despite the appeal of its claimed functionality, a state of the art 3D displaying device suffers from a serious shortcoming, it cannot interact directly with the conventional optical mouse, which is a 2D device. As a result, many professional graphics programs (e.g. AUTO-CAD®, Medical Images, etc.) face difficulties when used in a 3D application environment that relies on a conventional 2D optical mouse. For example, positional accuracy is lost and, adding to the difficulties, a significant amount of CPU power is consumed by the matrix transformation process for the 2D mouse data that is sent to the display. Finally, and perhaps even more importantly, the 2D mouse cannot provide angular displacement data for the graphics on the screen.

When a conventional 2D optical mouse interfaces with a graphical rendering device that is 3D (or "2.5D", by which is hereinafter meant 2D with a separate rotational axis capability), aside from the lack of the angular displacement data, there is an additional problem associated with the depth inherent in a 3D scene. FIG. 2 shows schematically how the conventional optical mouse falls short in representing depth, using a sketch of an airplane to illustrate this problem.

The skeleton of the airplane (204) is sketched by a 2.5D displaying device. When the operator moves the arrow (201) using a 2D cursor maneuvering device (i.e. mouse (209)) from one position to another (represented by arrow (204)), the arrow cursor may access the frame bars (202) and (203) along the path of its movement. Since what FIG. 2 shows is a 2.5D sketching system (so, the scene has depth), all the objects displayed in FIG. 2 (e.g. bars, propellers, rudders, wings, etc.) have their respective depth values. Unfortunately, the conventional 2D optical mouse (205) does not know all this. When a conventional 2D mouse (205) moves on its reference plane, it only senses the relative displacement data along X and Y coordinates; so, there is no way for the conventional mouse to ascertain or represent a depth.

The retina is a 2D organ. Using a 2D organ to analyze a 3D environment is like superimposing a 3D coordinate system onto the image frame captured by the conventional optical mouse. The human brain can recognize the location of an object in a 3D coordinate system by superposing a 2.5D coordinate system onto the image frame he/she captures from the retina. But within the image sensor of a conventional optical mouse, there is no such 2.5D coordinate system that can be used to inform the 3D "brain" of the display device. The prior arts reveal several approaches to the problem of providing 3D motion to a graphical rendering to be discussed herein. U.S. Published Patent Application 2013/0002555 (Geoffrey Lee) is similar to embodiment 3 of the present invention, but without the 3D aspect. U.S. Pat. No. 6,720,949 (Pryor et al) discloses tracking of fingertips or other targeted tool by a camera. U.S. Pat. No. 8,291,322 (Klappert et al) teaches an input device having an accelerometer for perspective drawings. U.S. Patent Application 2008/0036773 (Bae) describes a 3D drawing system and curve editing techniques. None of the teachings found above provide the same solution to the problem as will be described herein.

SUMMARY

It is a first object of this disclosure to provide a 3D maneuvering system (alternatively referred to as a cursor maneuvering system, a navigational device or navigator and, in particular embodiments, referred to as an optical mouse or a touch-screen device) which is able to provide 3D positional and motional data (i.e. in (x, y, z) format) without consuming excess microprocessor power and memory bandwidth.

It is a second object of this disclosure to provide such a system that can be used to move graphically rendered and displayed objects on a display device such as a computer screen or, with equal facility, to control motion of an electronic or electromechanical device such as a 3D printer or a physical model.

It is a third object of the disclosure to provide such a system that can be used for purposes requiring high accuracy.

It is a fourth object of this disclosure that the desired system be immune to human body vibrations.

It is a fifth object of this disclosure that the system have an ergonomic design that is "user-friendly," and can be used comfortably over long periods of time.

It is a sixth object of the present disclosure to provide such a system that supports hand movements that are linearly aligned to the movement of the cursor in the displaying device.

It is a seventh object of the present disclosure to provide such a system that easily supports at least one vanishing point when creating and maneuvering graphical renderings.

It is an eighth object of the present disclosure to provide such a system that supports an easy familiarization of the correlation between an operator's hand motions and the resulting effects visualized on the rendering device.

It is an ninth object of the present disclosure to provide such a system that enables artistic creativity by providing a transparency between the motions of the device and the corresponding effects of an object image on a screen.

It is a tenth object of the present disclosure to provide such a system that minimizes human error.

It is a eleventh object of the present disclosure to provide such a system that generates location and motion data using color analysis of a tinted reference plane or the analysis of other properties of electromagnetic radiation, such as polarization or phase, that is reflected from such a reference plane or emitted from such a plane.

It is an twelfth object of the present disclosure to provide such a system that generates location and motion data using pattern recognition of objects on a reference plane that may or may not be tinted.

It is a thirteenth object of the present disclosure to provide such a system wherein additional dimensions mapped from the 2D reference surface can optionally be used to turn on or off certain functions of the graphic display device.

The present disclosure that will satisfy these objects is a three dimensional (3D) navigation "system", that includes a mobile navigational device and a special "tinted" surface on which it moves or an equivalent device with a touch-sensitive surface that replaces motion with the effects of touch.

This system will achieve the above objects through its ability to maneuver an object/cursor in a 3D coordinate system by measuring and extracting position and motion vectors from a two dimensional (2D) "tinted" planar reference surface (e.g. a tinted mouse pad). The system will also be capable of providing or facilitating control of an electronic or electromechanical device such as a 3D printer or a physical model. Note that although one typically associates such a system or device with the maneuvering of a cursor or other object on a computer screen, the present system may be equally well applied to move some real object in space or control some electromechanical device such as a 3D printer; thus, the use of the term "cursor" is more historical than descriptive and simply referring to the system simply as a maneuvering system is more accurate. Note also that the term "tinted" will hereinafter refer most generally to a treated or coated surface that reflects (or refracts) incident electromagnetic radiation from the mobile navigational device or emits electromagnetic radiation as a result of absorption of and re-emission of the incident radiation from that mobile device or other portion of the system and the tinted surface may, thereby, affect the intensity, color (i.e., wavelength), polarization or phase (or other physical properties that characterize electromagnetic radiation) of the incident radiation in its form of emitted, refracted or reflected radiation.

Through application of this unique "tinting" method on the reference surface, each 2D geographical point on the reference surface will also have a unique hue parameter (e.g. by using CIE 1931 RGB color index data or the like to form a color gamut) and, through its hue parameter, each 2D point on the reference plane can be transformed (i.e., mapped) into 3D positional address data on a display screen (e.g. an x, y, and z position), or assigned a 3D motion vector for the screen display. The 3D data acquired from the navigational device, purely from motions along a tinted 2D surface, offers the following unprecedented advantages. First, the navigational device is able to detect the non-linear portion of the navigator body movement (e.g. rotation, etc.) imparted to it at a speed (as measured in fps, i.e., frames per second) far higher than that of an ordinary digital image capturing device. In the present navigational device, the non-linear portion of device movement can be measured by analogue circuitry which compares the hue values (converted into voltages) of a few pixels in different colors. Thus, the performance of the present invention is unrestrained by frame rate. Such circuitry, embodied in the analogue data processing scheme, mimics the basic functionalities of bee's eyes. Human eyes rely mainly on pattern recognition to determine the whereabouts of objects in their picture frame (e.g. pixel plane). Bees' eyes have many fewer optical receptors but, like human eyes, bee's photoreceptors are sensible to several colors (e.g. blue, yellow, etc.). In the bee's eye, however, the hue signals are not used for pattern recognition; instead, they are wired through neurons to guide the bee and to allow it to navigate through flowers without colliding with them. Judging by performance, a bee's eye is far better than that of human being in respect to motion detection. In the present disclosure, hue is also used for motion detection, allowing the present device to perform far better than the conventional optical mouse.

Second, the 3D navigator delegates the data acquisition processes associated with position (e.g. x, y, z) and motion direction (e.g. the unit vector of the plane of motion) to different features and corresponding algorithms; this unique manner of task delegation allows the presently disclosed navigational device to enjoy high positional accuracy, which is mainly attributed to the block matching algorithms (BMAs) used by the presently disclosed device (as also taught in commonly assigned application Ser. No. 14/056, 140, fully incorporated herein by reference), and the ability to control the non-linear motions of cursors/objects, which is mainly attributed to the hue sensitivity of the device. The deliberate task delegation process as is stated above allows the presently disclosed system to perform 3D motion detection tasks easily, without paying much penalty in calculation load.

Third, the positional data can be cross-referenced to a coordinate system that is embedded in a "coloration" reference plane (e.g. tinted mouse pad). The tinted reference plane provides a color gamut containing the hue data for the presently disclosed navigation device in a controllable manner, because the hue data varies from each geographic point to another in a gradual manner. Specifically, along a specific direction (e.g. the x-axis of the coordinate system embedded in the tinted reference plane), a parameter of hue (say CIE red color stimuli), will increase or decrease linearly along that direction. When there are three such kinds of hue variation profiles (e.g., tri-color stimuli) imprinted onto the tinted reference plane in an independent and non-interfering manner, the navigation device is able to acquire absolute 3D positional data from what is effectively an embedded 3D coordinate system which is actually determined by the tinting condition of the reference plane.

An ordinary computer relies on tracing targeted objects (e.g. using BMA, block matching algorithm) to determine the displacement of targeted objects in monochromatic image frames. When the motion of the device body is subject to extreme motions, a conventional optical mouse may easily lose track of the targeted object; in this situation, the computer may cease operating. With the operational features of the present navigational device, even after an extreme movement of the operator's hand, the device can still rapidly determine the positional data, which is a feature greatly desired by video game applications. Thus, the relation between the 2.5D coordinate system of the tinted reference plane and the 3D coordinate system used by the 3D graphic rendering system can be cross-checked or re-established at all times.

A bee also uses similar abilities to take a lengthy journey (e.g. several miles). Despite the fact that bees never see any objects clearly, they can take a long distance journey without getting lost. The fundamental capability that enables a bee to do such an amazing job lies on the hue map stored in its memory. This map is recorded together with the sunlight illumination condition (gradient of a sun ray denotes the direction to the point of infinity). If an engineer uses a sketch pad to simulate the bee's navigation map, it is as though the pad has a 3D coordinate system and a vanishing point. In a bee's 3D navigation map, there are many vectors (hue gradient is a vector), and there is a reference point of infinity, yet no object has a clear contour. In the next generation 3D optical mouse, these features will be built into the product. Thus, unlike the prior art which relentlessly pursues higher and higher frame rates, or uses coherent light sources, etc., the present invention disclosure provides a 3D navigation map. In the following paragraph, we will briefly review the functionality of a conventional optical mouse, and then illustrate the importance of having such a 3D navigation map.

An image presented by a 2.5D graphical rendering system mimics a human's neural system (i.e. the pixel frame is in fact a 2D one). The pattern recognizing capability of human eyes endows us with the capability of extracting features from the pixel frames (i.e. the retina). After imposing an artificial 2.5D coordinate system onto the pixel frame, the feature being extracted out of said pixel frame will have a 3D positional address. Such an image processing scheme requires many calculations; hence, human beings cannot see things clearly when a scene changes too rapidly. In nature, a human is a creature that is slow moving as compared to most other animals. On the other hand, a bee's eyes are designed to cope with rapid motions in an ever changing environment. When a bee flits from one flower to another, the image as is seen by bee's eyes is totally changed (this may just take a few seconds). If the bee used a human perception system, it would become dizzy. Fortunately, bees' eyes are far better than that of human being in this respect, they are able to detect motion at high speed without going through pattern recognition process. The hue data serves as a field of optical flow; so, to fly through flowers, a bee does not necessarily depend on any image that has a vivid contour of objects. If one uses a mathematician's theory to depict the bee's neural system, he/she would understand that the bee's eyes work by measuring the gradient of light flows in the different colors. Literally speaking, bee's compound eyes are a cluster of optical flow equations. When a human desires to improve their current product optical mouse, that human being can learn from Mother Nature. What the next generation optical mouse really wants to be, is a hue-sensitive one. With these understandings in mind, it becomes clear that the present invention represents the onset of a new era of the computer graphic industry, steering toward hue detection methodology. On the other hand, the device engineer must acknowledge that detecting motion only by hue is not an anodyne to the conventional art, there are limitations. A bee's eyes are not accurate in terms of locating objects; but the optical mouse used by a human being would require high positional accuracy. Thus, if a device engineer designs navigational circuitry based only on the anatomy of a bee's eyes, the device will have a high responsiveness to non-linear motions (i.e. be responsive to optical flow variations), but will have low resolution and poor positional accuracy. One can envision the drawback of the bee's eye by the following scenario. If some (potentially dangerous) object, larger than the bee, is approaching the bee slowly, the bee wouldn't be able to tell any danger is near because its eyes are not designed to recognize the object precisely. The 3D navigation device we human beings are intending to develop is one that requires high positional accuracy. In many applications (e.g. AUTOCAD drawing, 3D robot assisted medical surgery, etc.), positional accuracy remains a fundamental feature that cannot be sacrificed to the new requirement on non-linear motion sensing capability. Ever since the modern optical mouse was invented about twenty years ago, the demand for positional accuracy has been an emphasized requirement.

In order for it to acquire a 2D motion vector at high positional accuracy, a digital camera is mounted in a cavity underneath the mouse. Using a block matching algorithm (BMA), a series of pictures of the desktop surface are compared in a timely manner. Such a design rule has been utilized by the computer industry for a long period of time. Even today, the conventional optical mouse still literally controls nothing but the translational movement of an arrow shaped cursor on a 2D plane (i.e. displaying panel or computer screen). In 3D applications, the cursor (i.e. now a 3D object) does not necessarily lie on a 2D plane. Thus, both the positional accuracy and non-linear motion controllability are required for performing comprehensive 3D cursor maneuvering tasks. Facing these new requirements, the conventional optical mouse is outdated. There now emerges an imminent demand for the microelectronic industry to develop new means to detect the high order terms of motion vector (in 3D format) while maintaining a fairly good positional accuracy. As was stated above, the anatomy of the bee's eyes provides us with the clue. Their eyes recognize a few colors (i.e. hue), but their neurons respond to the variation of hue in a much different way than that of human eyes. The bee uses hue primarily as a means to detect motion, much less for pattern recognition. The merit of the bee's neural system has been amply demonstrated by observation of their agile and precise activities when they fly swiftly through a complicated 3D coordinate system, such as a flower-covered bush. The ecology of computer industry is nothing more or less than that of Nature, in which Darwin's rule prevails. That is, the conventional optical mouse industry is facing a critical point when the 3D graphic era must survive through improvement, or be extinguished. To improve the performance of an optical mouse, it is very natural that a device engineer will desire to add the non-linear motion controlling capability to the mouse unit. When a device engineer designs an electrical circuit that mimics the basic functionality of the bee's eyes, they may discover that the circuitry is much like an analog circuit (e.g. differential amplifier). A swift motion of an object from the left to the right side of the bee may cause certain neuron pairs in bee's eyes to have the opposite signal profiles as compared to that of another swift motion from right to left (e.g. A>B vs. A<B, where A and B are the intensities of the generated neural signals). The differential amplifier fabricated by modern microelectronic circuitry can have such a sensitivity, provided its input nodes are properly linked to certain hue detecting devices. In order to meet this goal, the optoelectronic sensors used by the presently disclosed navigational device must be hue-sensitive ones (e.g. a color sensitive CMOS sensor, etc.), and the planar reference surface used by the device must be a tinted surface. Thus, when the presently disclosed navigational device moves over the tinted reference plane, both the positional data as well as directional data (i.e. non-linear motion vector) will be generated concurrently (in commonly assigned U.S. Pat. No. 9,733,727 fully incorporated herein by reference), the two parameters are derived from the same "lumped" data). In most practical cases, the apparent color of the tinted reference plane will be composed of three primary colors (more or fewer colors are also possible, but they will be used for special situations). When the photo detector (e.g. photo-diode) in the device is responsive to these primary colors, the hue data as measured by the present invention are orthogonal (i.e., the red color index data will not interfere with that of blue colored light, and vice versa). Thus, the hue-sensitive digital camera embedded in the presently disclosed navigational device may "feel" that it is moving in a 3D space, just as a bee sees its surroundings when it flies through the flowers. As a result of these unique features, simply by moving the presently disclosed device over a tinted 2D plane (e.g. a tinted mouse pad), a corresponding object/cursor in a 3D graphic rendering device may be maneuvered. Moreover this maneuvering act concurrently enjoys high positional accuracy as well as high sensitivity to the non-linear motions. Thus, the presently disclosed device opens a new door for the electronic industry through which to enter into the 3D virtual reality regime.

From a physical point of view, a 3D graphic rendering device is an image processor, and an optical mouse is also an image processor (which stores data in pixel planes). The fundamental differences between the two image processing devices can be illustrated by reference to Eq's. (1) and (4). Consider a pixel, which can be considered as simply any object to be moved by the optical mouse. The pixel, denoted simply as P, is located at point P in a 3D orthogonal coordinate system. When pixel P is moved by a combination of rotational and translational displacements, whose parameters as are denoted by operators R and T in Eq. (1), it will reach a new position, denoted by point P'.

$$P' = R \cdot P + T = \begin{bmatrix} X' \\ Y' \\ Z' \end{bmatrix} = \begin{bmatrix} R_{11} & R_{12} & R_{13} \\ R_{21} & R_{22} & R_{23} \\ R_{31} & R_{32} & R_{33} \end{bmatrix} \cdot \begin{bmatrix} X \\ Y \\ Z \end{bmatrix} + \begin{bmatrix} T_X \\ T_Y \\ T_Z \end{bmatrix} \quad (1)$$

As is illustrated by Eq. (1), the rotational displacement R is not a single valued object, it is represented by a (3×3) matrix, i.e., $$\begin{bmatrix} R_{11} & R_{12} & R_{13} \\ R_{21} & R_{22} & R_{23} \\ R_{31} & R_{32} & R_{33} \end{bmatrix};$$

likewise, the translational displacement data T is not a single parameter data, it is a (3×1) matrix containing three translational displacement parameters, denoted as $$\begin{bmatrix} T_X \\ T_Y \\ T_Z \end{bmatrix}$$

in Eq. (1). As the consequence of these motions, the final position of P' is represented by $$\begin{bmatrix} X' \\ Y' \\ Z' \end{bmatrix}.$$

The rotation matrix R has several formats. As Eq. (2) shows, the rotation matrix R can be deemed as a combination (i.e. successive matrix multiplications) of three rotational matrixes, each of which designates a rotational motion around a single axis (i.e., x-axis, y-axis, and z-axis). Thus, as Eq. (2) shows, the rotational displacement of a point in a 3D coordinate system can be represented by three angular displacement data, i.e. $\phi$, $\varphi$, $\theta$. Substituting $\phi$, $\varphi$, $\theta$ for $R_{11}$~$R_{33}$ in Eq. (1), one can re-write the rotation matrix R, as is depicted in Eq. (2), and vice versa.

$$R = \begin{bmatrix} \cos\phi & \sin\phi & 0 \\ -\sin\phi & \cos\phi & 0 \\ 0 & 0 & 1 \end{bmatrix} \begin{bmatrix} \cos\varphi & 0 & -\sin\varphi \\ 0 & 1 & 0 \\ \sin\varphi & 0 & \cos\varphi \end{bmatrix} \begin{bmatrix} 1 & 0 & 0 \\ 0 & \cos\theta & \sin\theta \\ 0 & -\sin\theta & \cos\theta \end{bmatrix} \quad (2)$$

Alternatively, the rotational matrix R can also be depicted by Eq. (3), in which the parameters $n_1$, $n_2$, and $n_3$ denote the unit vector of the rotational axis $\vec{n}$ (i.e. the pivot axis), $\omega$ denotes the rotational angle around said rotational axis $\vec{n}$.

$$R = \begin{bmatrix} n_1^2 + (1-n_1^2)\cos\omega & n_1 n_2(1-\cos\omega) - n_3 \sin\omega & n_1 n_3(1-\cos\omega) - n_2 \sin\omega \\ n_1 n_2(1-\cos\omega) + n_3 \sin\omega & n_2^2 + (1-n_2^2)\cos\omega & n_2 n_3(1-\cos\omega) - n_1 \sin\omega \\ n_1 n_3(1-\cos\omega) - n_2 \sin\omega & n_2 n_3(1-\cos\omega) - n_1 \sin\omega & n_3^2 + (1-n_3^2)\cos\omega \end{bmatrix} \quad (3)$$

In practice, depending on the situation, one may select Eq. (2) or (3), or the other formats of rotational matrix R (e.g. a quaternion, etc.) for his/her own use, and the outcome should be the same. For example, Eq. (2) requires three angular data to describe a rotational movement ($\phi$, $\varphi$, $\theta$); as for Eq. (3), only one angular displacement data is required ($\omega$). The present navigational device uses Eq. (3) to derive the rotational matrix R.

Physically speaking, a prior art optical mouse is a mobile image sensor that takes successive pictures of a 2D planar reference surface (e.g. the desktop surface, a mouse pad, or the like), on which there lies a plurality of targetable microscopic objects (e.g. dust, surface imperfections or topological features generally). When there is a relative motion between the image sensor and the reference plane, a corresponding movement of these targetable objects takes place in the image sensor, which is usually formed by a plurality of pixels. The motion of these pixels can be represented by Eq. (4), in which the parameter M denotes the rotational displacement, and the parameter $T_{Optical\_mouse}$ denotes the translational displacement, respectively.

$$P'_{Optical\_mouse} = M \cdot P_{Optical\_mouse} + T_{Optical\_mouse} \quad (4)$$

$$= \begin{bmatrix} \cos\vartheta_x & -\sin\vartheta_y \\ \sin\vartheta_x & \cos\vartheta_y \end{bmatrix} \cdot \begin{bmatrix} X \\ Y \end{bmatrix} + \begin{bmatrix} T_{X,2D} \\ T_{Y,2D} \end{bmatrix}$$

Eq. (4) is the most general mathematical representation of a 2D motion sensing camera. The typical conventional optical mouse found in today's consumer electronic market can only measure the translational displacement data, i.e. $\begin{bmatrix} T_{X,2D} \\ T_{Y,2D} \end{bmatrix}$ of Eq. (4). In the past, there were only very few inventions attempting to measure the rotational term M of Eq. (4). Commonly assigned Ser. No. 14/056,140, Filing Date Oct. 17, 2013, fully incorporated herein by reference, discloses an optical mouse that also measures the rotational displacement data M of Eq. (4) by extracting it from a lumped translational motion vector data. This device allows the next generation cursor maneuvering device to have a rotational functionality without requiring an operator to change his/her habits of moving the mouse in some exaggerated fashion.

In a 2.5D system, the positional data originally in 2D format can be converted to a 3D format. Thus, when the translational data and rotational data are converted into 3D format, an optical mouse is able to determine the final position P'. By imposing a 2.5D coordinate system onto the images captured from the reference plane, the present device allows a computer to recognize that the data acquired from the presently disclosed navigational device is 3D data. In the past, the positional data measured (and transmitted) by the optical mouse was only 2D data, so the computer had to exercise a 2D to 3D data transformation process to generate the 3D motion vector it needed (e.g. ΔX, ΔY, ΔZ). Because there is no validated physical relationship between the mouse and computer, the above stated transformation process requires extra CPU computation power, and it does not intuitively correspond to the hand movement of the operator. The consequence of the above processes is that there is a loss of realism in the motion of the 3D object as we normally see in today's 3D graphic rendering device, and the interaction between the operator and computer is restricted.

One of the objectives of the present disclosure is to provide 3D positional data from a 2D planar reference surface by measuring its "tint" or other optical features of an electromagnetic wave that is reflected from or emitted by that surface, and to establish a 2.5D to 3D data transformation process from that measurement. If we shine three light rays of different colors (e.g. R, G, B) onto a 2D reference surface that is reflectively coated, then every point on the reference surface can reflect light in a hue value that is denoted by a set of tri-stimuli data (e.g. CIE1931 RGB). After data conversion, the present device is able to provide the positional data in 3D format. Hence, by moving the present mouse (i.e., navigational device) body on a "tinted" 2D reference surface (e.g. desktop surface), 3D positional data is provided for the computer to use. Thus the hue data contained in the color gamut provides a method of mapping the 2D surface of the planar reference surface into the 3D space of the graphic rendering device (or other electronic or electromechanical device) in 3D format. The prior art optical mouse is a monochromatic device; therefore, it lacks this capability of providing motion data in 3D format. FIGS. 3A and 3B schematically show the relationship between a 2.5D coordinate system and a 3D coordinate system.

As FIG. 3B shows, there is a geometric relationship between a 2.5D cursor maneuvering device and a 3D coordinate system. That is, for an arbitrary point that is labeled as (x, y, z) in a 3D coordinate system (e.g., the black dot in 3A), its whereabouts in a projected 2D plane can be denoted as (x', y') and the two sets of coordinate data (i.e. 2D and 3D) can be converted from one to another in accordance with Eq's. (5A) and (5B), respectively.

$$x' = x - z \cos \sigma \quad (5A)$$

$$y' = y - z \sin \sigma \quad (5B)$$

As is shown in the exemplary illustration of FIG. 3A, the 3D object (i.e., the cube) has all of its edges intersecting at a 90 degree angle (θ=90). Depending on the perspective angle chosen, the corresponding angle σ of the cube projected in FIG. 3B is a parameter chosen by the 2.5D displaying device (schematically denoted as (301B), which is literally a 2D plane from a physical point of view, with a being about 45 degrees). From Equ's. (5A) and (5B), one can understand that when the tinted reference plane is illuminated by a specific lighting condition (i.e., intensity), the mathematical plane function formed by the set of all geographical points on the reference plane is nothing more than that of a 2.5D coordinate system. However, if there are changes in the lighting condition or the shutter speed of the image sensor, or other features of the presently disclosed device that produce a similar effect, then the mathematical function of said 2.5D plane will be correspondingly changed. Mathematically, this is equivalent to saying that the 3D plane has changed its unit normal vector. Using this method, the present disclosure provides a revolutionary navigational device in the form of a 3D optical mouse that, by a single movement of the operator's index finger, can change the direction of the 3D cursor/object. Furthermore, by that single movement of the device relative to the reference plane, the 3D cursor/object can be maneuvered by the translational displacement data and rotational displacement data concurrently. Based on Eq. (1), the above set of data meets the requirement sufficiently for maneuvering an object/cursor in a 3D graphic rendering system.

In the present disclosure, the rotational matrix R of Eq. (1) can be calculated using Eq. (3). According to Eq. (3), a rotational matrix R can be derived as a function of a rotational angle ω and a unit vector n̂, where n̂=(n₁, n₂, n₃). In practice, $n_1$, $n_2$, $n_3$ can be given by the computer program; or, it can be adjusted by the presently disclosed navigator (e.g. (401) of FIG. 4). At the moment, for easier narration, we take $n_1$, $n_2$, $n_3$ as the known factors. FIG. 6A schematically shows the phenomenon of moving the presently disclosed navigator without changing the parameters $n_1$, $n_2$, and $n_3$. When $n_1$, $n_2$, and $n_3$ are not changed during the navigation movement, the arrow shaped cursor (604) will only move in plane (603A) in the 3D graphic rendering device (608A). In this exemplary case, we denote plane (603A) as an aisle. Items (606A) and (602A) are the walls on both sides of aisle (603A). Thus, regardless the motion of the navigator (502) on the reference plane (510), cursor (604) will not crawl onto the walls (606A) and (602A). This gives the operator a more realistic feeling.

Inside the computer memory, there is a place that stores the 3D coordinate system and the addresses of those features (e.g. aisle and walls). Specifically, as is shown in FIG. 6C, the arrow shaped cursor (604) denotes point C in said 3D coordinate system. By the same token, point C of FIG. 6C corresponds to point B on the planar reference surface (606), as is shown in FIG. 6B. Whenever the operator moves the navigator (607) by a motion vector ($\Delta x^*$, $\Delta y^*$) on the reference surface (606) (e.g. on a mouse pad), the point C in the 3D coordinate system will be moved by a corresponding motion vector ($\Delta x^{}$, $\Delta y^{}$), and the arrow cursor (604) will be moved in the displaying device (608A) correspondingly. Note again that, unless the unit vector $\hat{n}$ in FIG. 6C is changed, regardless of whatever motion vector is acquired from motion relative to the reference plane (606), point C will not be moved out of the plane $a_1b_1c_1$. In the graphic rendering device, such a situation implies that the 3D cursor 604 will not be moved out of area (603A) in FIG. 6A. This unique feature offers unprecedented advantages for a 3D GUI (Graphical User Interface) that requires high positional accuracy. As is well known in the state of the art optical mouse industry, an optical mouse can easily reach a resolution of hundreds, or thousands dpi from a planar reference surface. But the resolution of a state of the art 3D game controller cannot easily match this specification. Thus, the presently disclosed navigator can serve as both a high sensitivity and high resolution 3D cursor/object maneuvering device for advanced 3D applications, the premise being that it has a capability to manipulate the unit vector $\hat{n}$. This issue has been implemented by a unique feature (i.e. touch sensitive feature (401) of FIG. 4) provided by the present invention, which will be elaborated in the latter paragraphs as an additional embodiment. In addition, U.S. Pat. No. 9,733,727, which is fully incorporated herein by reference, has disclosed a method and a corresponding navigational device for implementing that method for providing rotational displacement data by measuring the relative movement of that navigator on a 2D reference plane. In a like manner as in commonly assigned U.S. Pat. No. 9,733,727, as schematic FIG. 7B shows, the presently disclosed navigator is able to provide a rotational motion data ($\omega^*$) during the course of its translational movement ($\Delta x^*$, $\Delta y^*$); as shown in schematic FIG. 7C, the computer recognizes the respective motion parameters as ($\Delta x^{}$, $\Delta y^{}$) and $\omega^{}$. In the corresponding 3D graphic rendering device as is shown in FIG. 7A (or any device that has 3D motion features and capabilities, such as a 3D printer), cursor (704) is subjected to the translational motion vector (706) as well the rotational motion vector $\omega^{*}$. Note that both the translational and rotational motions of cursor (704) occur on plane (703A). Thus, there will be no out-of-plane motions for the cursor (704) because the unit vector $\hat{n}=(n_1, n_2, n_3)$ of plane $a_1b_1c_1$ is not changed in this case. In many 3D applications (e.g. video games, AUTOCAD™), this feature provides unprecedented advantages for the operator in that the 3D positional data provided by the present navigational device can move an object in a reference plane that is very familiar to the operator. Compared to most of the present mass-market haptic devices (e.g. EM trackers, depth camera, wii, etc.), the present device is far more accurate, sensitive, and adaptable to the operator, making itself particularly useful to the professional who works in such areas as surgery, based on a use of 3D medical images.

When the parameter $n_1$, $n_2$, or $n_3$ is changed, the point of intersection between the plane and the three axes of the coordinate system will be changed accordingly. As FIG. 8C shows (an exemplary case), when the unit vector changes, inside the computer memory or in the navigator's internal memory the plane of cursor motion will be changed from $a_1b_1c_1$ (whose unit vector is $\hat{n}$) to $a_1b_1"c_1$ (whose unit vector is $\hat{n}"$). Correspondingly, in the 3D graphical rendering device, the plane of cursor motion has been changed to (803A). Following this plane (803A) tilting action, cursor (804) is now more "upwardly" tilted as compared to that of FIG. 8A. Thus, due to the new plane position, cursor (804) is able to reach point (806), the ceiling of the aisle, which was not the case for the cursor of FIG. 7A. By the same token, as FIG. 9C shows, when the cursor motion plane has been changed to plane $a_1b_1*c_1$, cursor (904) will be moving along plane (903A). As a result, cursor (904) is unable to reach point (901A), the end of the aisle, whereas the cursor in FIG. 7A can.

In practice, the operator may perform all of the above described 3D cursor maneuvers using one hand (i.e. cursor maneuvering, and plane tilting), controlled by a collaboration between finger gestures (e.g. index finger), wrist motion, elbow and arm movement, etc. As FIG. 10B shows, the operator may move the navigator (1007) by a translational motion vector (Tx, Ty, Tz), and a rotational motion vector $\omega$; during the course of these combined motions, the operator may wiggle his/her index finger (1009) over a unit vector adjustment device (1008) (e.g. a Lambertian touch sensitive plate to be described below as a separate embodiment). The point I (more precisely, the area) where the operator's finger contacts the touch sensitive device, denotes the value of $n_1$, $n_2$, and $n_3$ of the unit vector $\hat{n}$ of the cursor motion plane. Hence, as FIG. 10A shows, the arrow cursor moves from (1004A), through (1004B), and finally, by the combination of the operator's finger and hand movement reaches (1004C). The above mentioned Lambertian plate has been disclosed in commonly assigned related applications Ser. No. 13/482,086, Filing Date May 29, 2012, and Ser. No. 13/743,582, Filing Date Jan. 17, 2013, both fully incorporated herein by reference. In practice, there are still other ways to acquire the 3D vector (i.e. unit vector of the mouse maneuvering plane) by finger movement. For example, a "wiggling knob" (a specific control device on the navigator) can be configured to do the same job, but its resolution usually is lower than that of a Lambertian touch sensing plate. To the viewers, all of the above stated cursor positions are changed smoothly and continually-The cursor/object's motion follows the continuous motion of the operator's hand's and finger's movement immediately and responsively, making the presently disclosed navigational device to be a 3D cursor/object controlling device of unprecedented qualities. Note that one should not equate the presently disclosed navigator with the "gesture sensing device" cited in many prior art references. FIGS. 11 and 12 schematically show two kinds of gesture sensing devices provided by the prior art. Specifically, the device of FIG. 11 uses electromagnetic (EM) waves to detect the motion of the operator's hand (1102) (which grips an EM tracker). As for FIG. 12, a depth sensitive camera (1204) is observing the movement of the operator's hand (1202). If one observes the mechanistic performance of these two devices, they will realize that because a human body is flexible, human body vibration is, therefore, inevitable in most situations. As the schematic models of FIGS. 11 and 12 show, if we use springs (1103) and (1203) to denote the mechanism of body vibration, various types of vibrational modes can be imposed on the operator's hand (1102) and (1202). Thus, the motional data measured by detectors (1104) and (1204) are constantly generating errors (i.e. ($\pm x$, $\pm y$, $\pm z$)). In professional applications (e.g. manipulating medical images, aerospace 3D parts fabrication, etc.), errors incurred by the operator's hand vibration are not desired. FIGS. 13A and 13B show this vibrational phenomenon. In both figures, the operators who are being tracked by the detectors (e.g. 1104 or 1204) are in different body positions (e.g. FIG. 13A, sitting; FIG. 13B standing), the motion vectors generated by the two body gestures (i.e. one in FIG. 13A, the other FIG. 13B) are subjected to different kinds of vibrational errors as a result of the different body positions. Using the present navigation device as shown in FIG. 5, the navigator (502) is positioned over a supporting plane (510). Hence, human body vibrations can be suppressed. This seemly simple and conventional method of device navigation has somehow been discarded by many 3D cursor controlling devices. Inside the presently disclosed navigator, motion detection circuitry is constantly comparing the images captured at different time intervals. A typical method used by this circuitry is the block matching algorithm (BMA) as discussed in Ser. No. 14/056,140, Filing Date Oct. 17, 2013. When the frame rate is very high, the motion vector calculated by the BMA method can fall within a range as small as a few pixels (e.g. a few µm), with a small amount of deviation that is possibly caused by the non-linear portion of mouse movement.

The present invention makes use of methods previously disclosed in commonly assigned Ser. No. 14/056,140, Filing Date Oct. 17, 2013 to separate out the non-linear portion of the present navigator's motion vector. Thus, rotational motion data can be extracted in a way that allows the data of the rotational matrix R in Eq. (3) to have a consistent interpretation at all times. Together with the translational motion data (which is already very sensitive and of high resolution because of the use of state of the art image capturing techniques), the data acquired by the presently disclosed navigator uses the image processing methods of physics to produce high sensitivity and high resolution 3D cursor maneuvering capabilities.

As FIG. 14A schematically shows, the next generation cursor maneuvering device will have to operate on a great variety of surfaces, e.g., a sofa surface (1403), bench top (1404), or a tiled floor section (1405), etc. These surfaces have vastly different topographical properties (i.e., the respective SQUAL values vary greatly). If a cursor maneuvering device cannot operate on at least some of these surfaces in a stable and predictable manner, it will not satisfy those family members who may typically situate themselves in a specific area in the living room where a firm, stable, planar reference surface is not available. So, a fundamental requirement for the next generation optical mouse, if it is to succeed in the market, is a wide adaptability to various kinds of surfaces. If we translate such a requirement to the terminology used by the mouse industry, it means that the range of SQUAL values for next generation optical mouse will be far wider than that of today's mouse. So, the present navigational device, which is envisioned herein as being that next generation optical mouse, is not necessarily a device that pursues extremely high dpi (dots per inch) or operability on a glossy surface (some prior arts believed this is the key selling point), but it is one having wide adaptability to various kinds of surfaces. Related application Ser. No. 13/834,035, Filing Date Mar. 15, 2013, fully incorporated herein by reference, provides this feature. Besides surface adaptability, there is another requirement for next generation optical mouse, an integrated 2D and 3D cursor maneuvering functionality. As FIG. 14A shows, this requirement is incurred because the same displaying device (1401) in the living room will be used by different applications. For example, when the exemplary flat panel displaying device (1401) is used by a family member to play 3D video games, the present invention must work as a 3D navigator. When the flat panel displaying device (1401) is used by another family member to read news on a web site (a news report is a 2D plane), the presently disclosed navigational device works as a 2D cursor maneuvering device. In the future, swapping between 2D and 3D scenes on the same display and in the same application can happen suddenly and often unexpectedly. An exemplary case is illustrated in schematic FIG. 14C. When the operator moves an arrow shaped cursor using the present navigational device, the position of that cursor changes from (1426A) to (1426B) and finally to (1426C). The 3D display device (its screen shown here as (1425)) is aware that the cursor is in a 3D space and the instruction menu bar (1423) is defined by the display as being located at the side nearest the operator. Thus, neither of the three cursor positions (1426A) to (1426C) can cross over the menu bar (1423).

A 2D mouse cursor (shown as dark arrow (1424)) would be able to access the instruction bar when it is close to the bar, but it cannot tell that there is a vanishing point for perspective (1421) in the display (1425). By integrating the above two functionalities (2D and 3D) in one system (i.e. a combined 2D/3D optical mouse), the present system of navigator plus surface allows the operator to enjoy the convenience of having those two features on one product body. There is a further unique characteristic of the presently disclosed navigator. On its tinted reference surface, every geographic point will be able to provide either 3D positional data or 2D positional data, or both, in a corresponding way (i.e. they can be converted back and forth). Under a severe circumstance, such as the navigation device being accidentally "jolted" by an action of operator's hand (such as when an operator is playing a fierce battleground video game), wherein the morphology of the images taken by the navigator lose their correlations, the presently disclosed navigation device may occasionally lose track of the targeted objects. In this situation, the tinted reference plane can support the presently disclosed navigator to quickly find out its whereabouts by measuring the hue value from the tinted reference plane.

To meet the above the requirement, the presently disclosed system uses a color sensitive feature (i.e. comprising multiple-wavelength illuminating system and a wavelength sensitive sensor) to trace the microscopic objects. According to color physics, a set of color index data such as CIE1931 RGB can be converted to another set of data such as X, Y, Z by Eq. (6).

$$\begin{bmatrix} X \\ Y \\ Z \end{bmatrix} = \begin{bmatrix} D_{A=1,B=0,C=0} & D_{A=0,B=1,C=0} & D_{A=0,B=0,C=1} \\ E_{A=1,B=0,C=0} & E_{A=0,B=1,C=0} & E_{A=0,B=0,C=1} \\ F_{A=1,B=0,C=0} & F_{A=0,B=1,C=0} & F_{A=0,B=0,C=1} \end{bmatrix} \times \begin{bmatrix} A \\ B \\ C \end{bmatrix} \quad (6)$$

Where A, B, C are the color stimuli, e.g. CIE 1931 RGB color index; X, Y, and Z are the 3D locational address derived by Eq. (6); and the elements in the matrix of Eq. (6), i.e. D, E, and F, are converting factors. FIG. 5 schematically shows the generic structure of the present navigational device (502). When a properly constructed reference plane (510) is illuminated by light sources (503, 505, and 507) in different colors (e.g. R, G, B), the reference plane literally is "tinted" by the respective light sources. (Note that the light sources 503, 505, and 507 can be placed anywhere in the navigation system; whenever the method of light source placement is changed, the respective results shall change as the natural consequence incurred by the relative position between said respective light sources and reference surface 510). If the output power of the respective light sources are fixed, the tinting condition of the reference plane will be denoted by a specific relative ratio of the intensity of light in different colors impinging on the optoelectronic sensor (509) such as a CMOS sensor, i.e. the ratio R:G:B. We now use a color gamut to explain this in further detail. Referring now to FIG. 15A, the locus that passes through points Q, R and S denotes the full color gamut (e.g. at D65 lighting condition). As FIG. 5 shows, light sources (503, 505, and 507) are shining light at the planar reference surface (510) in different (e.g. red, blue, and green) colors and, in general, from different angles (e.g. 0°, 120°, and 240°, but not shown here); the area on the reference plane (511) of which pictures are taken by the sensor (509) within the disclosed navigator (502) can be represented by a rectangular block (i.e. the range of the optoelectronic sensor), which is denoted as (1516) in FIG. 15A. Of course, when the geometrical format of optoelectronic sensor (509) is not in rectangular shape, the shape of item (1516) will be changed accordingly. This rectangular block (1516) is then redrawn in FIG. 15B as plane (1507), on which every geographic point can be denoted by a unique color index data (e.g. CIE 1931 RGB). In FIG. 15B, we have picked out a point P' to denote the origin of a 3D coordinate system having its three axes passing through point Q', R', and S'. Likewise, we have designated the address of the other three points on the reference plane to be Q", R", and S". Since Point P', Q', R', and S' have different apparent colors, using Eq. (6), one is able to convert the respective color index data into 3D positional data. Namely, we have picked out point (0, 0, 0), $(a_1, 0, 0)$, $(0, b_1, 0)$, and $(0, 0, c_1)$ from a 3D orthogonal coordinate system. FIG. 6C shows that the mathematical plane on which cursor maneuvering occurs intersects with the axes of the coordinate system on $(a_1, 0, 0)$, $(0, b_1, 0)$, and $(0, 0, c_1)$. Hence, the equation defining this plane can be denoted as P1

$$\frac{x}{a_1} + \frac{y}{b_1} + \frac{z}{c_1} = 1 \tag{P1}$$

Thus, when the presently disclosed navigator moves over a reference plane tinted by light sources 503, 505, and 507, the address of all geographical points lying thereon will satisfy Eq. (7). As FIG. 15D shows, when a targeted object (1518A) is moved in a pixel frame (1507D), the pattern (e.g. square shape, with square block, with the two diagonals designated by dark and bright pixels) of said targeted object (e.g. 1518E) will not be substantially changed by this motion. However, the relative intensity of light flows onto the respective pixels will be changed (e.g. the signal level of the brightest pixel 1518F vs. that of the darkest pixel 1518E) in accordance with the relative distance between pixels and light sources. This phenomenon poses serious challenges for the prior art which uses block matching algorithms (BMA) to trace motions in that the BMA result will be different for 1518A, B, C, D. In the present invention, the illuminating sources (i.e. 503, 505, and 507) are mounted in the cavity on predefined positions (e.g. 0°, 120°, and 240° around the targeted object). Hence, object 1518A, 1518B, 1518C, and 1618D (actually they are the same object being pictured from different locations) will have different apparent colors in accord with their relative distances to the light sources of the navigator. Such a difference can be very delicate, but it does exist. Using a highly color sensitive feature (e.g. high gain differential amplifiers), the present navigational device is able to determine the location of a targetable object. When the navigator takes successive images of a targeted object that lies on the "tinted" reference plane, the trajectory of the targeted object can be measured, and the hue value of said targeted object can be measured as well. Hence, by analyzing the hue data of the targeted object, the presently disclosed invention is able to determine the location as well as motion (linear and non-linear) of the targeted object with high precision.

"When the tinting condition of the reference plane is changed, the respective point of intersection on the coordinate system will be changed to, for example, $(a_1, 0, 0)$, $(0, b_1'', 0)$, and $(0, 0, c_1)$. Again, as is denoted by FIG. 8C and P2, a new plane describes this circumstance (i.e., the plane representing the reference surface being tinted by the above new tinting condition is denoted by $a_1 b_1'' c_1$).

$$\frac{x}{a_1} + \frac{y}{b_1''} + \frac{z}{c_1} = 1 \tag{P2}$$

As FIG. 15B shows, when the presently disclosed navigator designates a specific 3D reference plane by a predefined tinting condition, it will be able to move the cursor/object from point A' $(x_1, y_1, z_1)$ to B' $(x_2, y_2, z_2)$ on that plane, whose points of intersection with the three axes of the coordinate system are Q', R', and S' respectively. In the prior art, the cursor maneuvering reference plane is considered only as a flat plane; there is no depth for the prior art's reference plane. As a result of the surface tinting capability, when the presently disclosed navigator moves from point A to B, as a result of the variation of tinting condition, the z values change from $z_1$ to $z_2$; this denotes a situation where the depth value of the cursor/object has been changed. So, in the computer screen (1507D') of FIG. 15C, the cursor appears as being moved closer to or away from the operator, corresponding to the navigating act of the navigator (1502) on the reference plane (1513), which is in fact a 2D plane. In commonly assigned Ser. No. 14/056,140, Filing Date Oct. 17, 2013, a method is given by which rotational displacement data ω can be measured from the mouse movement on a 2D reference surface. Thus, the present system is able to use the teachings of Ser. No. 14/056,140, Filing Date Oct. 17, 2013 to adjust the direction of the cursor (604) (e.g. the one having an arrow shape in FIG. 6A); note that cursor (604) is always moving along the 2D plane (603A) in the 3D graphic rendering device (608A), unless the operator wiggles his/her finger on the plane tilting angle adjust device (607) in FIG. 6B or unless the computer program itself adjusts the plane orientation of plane (603A) automatically.

When we want to tilt the cursor moving plane (603A), according to Eq. (3) the presently disclosed device has to provide a new set of unit vectors ($\hat{n} = (n_1, n_2, n_3)$) in order to derive the rotational matrix R for Eq. (3). As FIG. 6C shows, in default condition, the unit vector $\hat{n}$ is normal to the original cursor motion plane $a_1 b_1 c_1$. In practice, the normal vector $\hat{n}$ can be acquired from P1 or P2, or any 3D plane function (e.g. some data stored in the computer). Hence, while moving the navigator body (607) on reference plane (606), the unit vector can be adjusted by the operator's finger wiggling action on the plane tilting device (608) in FIG. 6B; the wiggling action of the finger allows the unit vector normal to the new cursor motion plane to not be normal to the original cursor maneuvering motion plane (603A). This denotes a situation where the cursor/object is pointing at some direction out of the original cursor motion plane (1507). Under this circumstance, in the 3D graphic rendering device (this can be illustrated schematically in FIGS. 8A and 9A), the operator will see the object/cursor (e.g. (804) and (904)) as being tilted by an angle in the space. From a mathematical point of view, one is able to deduce that the original normal vector of the plane expressed by P1 is ($a_1$, $b_1$, $c_1$). When the plane is tilted, the corresponding unit vector will be changed to ($a_1$, $b_1''$, $c_1$) per the case designated by P2. On the color gamut (1502), we understand that terminal points Q, R and S denote the three positions having the highest intensity of one color but the lowest intensity of the remaining two colors. In FIG. 15B, each of the three points Q', R', and S' in the reference plane correspond to the three points that have the highest coordinate values on each axis, (i.e. (S', 0, 0), (0, Q', 0), and (0, 0, R')). Thus, we will understand that point R' is the representative of a color index data (R, 0, 0), where R in the parenthesis denotes the red color parameter (e.g. CIE 1931 RGB). Likewise, point Q' is the representative of the color index data (0, G, 0), whereas G in the parenthesis denotes the green color parameter. By the same token, point S' is the representative of a color index data (S, 0, 0). FIG. 15E shows that different 3D planes (e.g., (1519) and (1520)) can be constructed by using different tinting conditions and they will be characterized by different unit normal vectors (i.e., $\hat{n}_i$, $\hat{n}_{ii}$ where $\hat{n}_i$ is the unit vector of plane $a_1 b_1 c_1$, and $\hat{n}_{ii}$ is the unit vector of plane $a_2 b_2 c_2$). Once the above situation is established, the following formulas (i.e. Eqs. (6A), (6B), and (6C)) can be expressed.

$$\frac{R}{R+G+B} = \frac{n_1}{n_1+n_2+n_3} \quad (6A)$$

$$\frac{G}{R+G+B} = \frac{n_2}{n_1+n_2+n_3} \quad (6B)$$

$$\frac{B}{R+G+B} = \frac{n_3}{n_1+n_2+n_3} \quad (6C)$$

Now we refer back to Eq. (3). When the values of rotational angle $\omega$, $n_1$, $n_2$, and $n_3$ are derived, the rotation matrix R can be determined. Furthermore, when the rotation matrix R is determined, as Eq. (2) shows, the rotational angles around x-axis, y-axis, and z-axis (i.e. $\phi$, $\varphi$, $\theta$) can be determined.

To an image sensor, hue value denotes photon flux in a specific wavelength (or a specific range of wavelengths) flowing onto the image sensor. A conventional cursor maneuvering device does not have the capability of using optical flow or hue value to measure motion vectors, or even the locations of objects. Thus, the present device exceeds the conventional art by its application of fundamental physics, i.e., of optical flows in different colors. In prior art (i.e. commonly assigned Ser. No. 14/056,140, Filing Date Oct. 17, 2013), the navigator disclosed therein is able to extract the rotational motion displacement from a lumped 2D translational motion vector. We apply this technique to FIG. 7B, and determine that the translational motion vector is ($\Delta X^*$, $\Delta Y^*$) and the rotational displacement as was disclosed by Ser. No. 14/056,140, Filing Date Oct. 17, 2013 is the label $\omega^*$ in FIG. 7B. Hence, the present invention is able to maneuver an object from one point to another in a 3D coordinate system by two different kinds of motions applied concurrently: translational and rotational motions; this has not been done in the prior art (i.e. conventional optical mouse). The present device is, therefore, a further significant advance of what is taught in Ser. No. 14/056,140, Filing Date Oct. 17, 2013. By providing the above stated unit axes (i.e. $n_1$, $n_2$, $n_3$), the presently disclosed navigator is able to move the cursor/object out of the original cursor motion plane (e.g. 1507 of FIG. 15B). In practice, while moving a cursor in a 3D coordinate system, the presently disclosed navigator crawls along a given 2D reference surface, provided the unit vector $\hat{n}$ is not changed. The value of $n_1$, $n_2$, and $n_3$ of Eq. (3) can be adjusted in more than one way (e.g. adjusted by the mouse buttons, given by the computer program, etc.). It is also to be noted that both the 3D translational motion vector ($T_x$, $T_y$, and $T_z$) and the rotational motion vector R in Eq. (1) are generated by one gestural movement of the operator's hand (i.e. there is no need to decompose a motion into several intermediate ones, like some of the prior arts require), this unique feature matches the natural behavior of the human skeletal system, where the translational and rotational movements often take place simultaneously, by one gestural instruction given by the brain, with no motion decomposition. Thus, an important benefit offered by the present system is that the operator does not have to dissect a motion of the cursor by moving the navigator through several intermediate steps; this greatly reduces a barrier for new adopters in learning how to use the navigation device and system.

It is to be noted that there is more than one way to determine the value of $\omega$ of Eq. (3), the 3D rotational displacement data. In the first method, one may use the method taught by commonly assigned Ser. No. 14/056,140, Filing Date Oct. 17, 2013, use a block matching algorithm (BMA) to determine lumped translational motion vector(s), then decompose the lumped translation motion vector(s) into a pure translational motion vector and a rotational motion vector. In a second way, the rotational angle $\omega$ is determined by the second embodiment of the present system (see below). In either way, the rotational motion vector $\omega$ can be used in combination with the unit vector ($n_1$, $n_2$, $n_3$) to derive the rotational matrix R of Eq. (3). This matrix R offers great advantages to modern 3D graphical rendering devices in that much of the calculating processes on the computer, e.g. for deriving ($n_1$, $n_2$, $n_3$), or $\phi$, $\varphi$, $\theta$, can be eliminated. A conventional cursor maneuvering device cannot do this easily.

From the above illustrations, it can be seen that the presently disclosed 3D navigation device is a high quality, even revolutionary, 3D optical mouse having the ability to:
(1) Provide a 3D locational address in a format like (X, Y, Z).
(2) Provide 3D rotational displacement data, like $$\begin{pmatrix} R_{11} & R_{12} & R_{13} \\ R_{21} & R_{22} & R_{23} \\ R_{31} & R_{32} & R_{33} \end{pmatrix}.$$

(3) Fetch 3D data from a 2D reference plane.
(4) Adjust the depth value of an object instantly, in a robust manner.

The modern optoelectronic image sensor is a 2D device that comprises a plurality of pixels within an image frame. Thus, the measurement of motion of an object on a reference surface is the result of measurement of light intensities in a pixel representation, and that measurement takes two optical effects into account simultaneously: 1. the actual physical motion of the object and; 2. optical artifacts that result from the variations of light flow (e.g. hue variations occurring during motion). The following is a brief presentation to indicate the roles of these physical and optical effects. We will refer to the navigating device as an optical mouse, without loss of generality. We also recall that the motion of an object being referred to is motion of that object relative to the moving mouse, i.e. the object may be some fixed particles or other topological features on the surface of the mouse pad over which the mouse is moving.

We assume that an object is moving in (or relative to) some space, e.g., on a mouse pad, which is a 2D space, or in some surrounding ambient, which is a 3D space. Either will suffice for the following illustration. The image sensor is a 2D optoelectronic device comprising a plurality of pixels. Hence, after a complete image capturing process (e.g. a shutter opening and closing), we can denote the respective pixel data by a time-dependent light intensity function I (x, y, t). When the object moves, the image sensor senses a corresponding motion vector (velocity) $\dot{m}$ in the pixel plane, which is denoted as $$\dot{m} = [x, y]^T \tag{7}$$

Thus, we have $$v_m = \dot{m} = [v_x, v_y] = \begin{bmatrix} dx/dt \\ dy/dt \end{bmatrix} \tag{8}$$

Assume $\dot{m}$ is unchanged in the time interval dt, that is, $$I((x+v_x dt), (y+v_y dt), (t+dt)) = I(x, y, t) \tag{9}$$

Again, I(x, y, t) denotes the intensity of light as is detected by a photo-sensor lying at the position (x, y) in a 2D image frame at time t.

If the illuminating source of an optical mouse (e.g. an LED cluster) projects three light beams, each in a color different than those of the others (e.g. R, G, B), and the image sensor embedded in that same optical mouse is color sensitive to each of the colored light beams (i.e. it can tell the differences among the light beams in different colors), then Eq. (9) can be re-written as Eqs. (10A), (10B), and (10C).

$$I_{RED}((x+v_x dt), (y+v_y dt), (t+dt)) = I_{RED}(x, y, t) \tag{10A}$$

$$I_{BLUE}((x+v_x dt), (y+v_y dt), (t+dt)) = I_{BLUE}(x, y, t) \tag{10B}$$

$$I_{GREEN}((x+v_x dt), (y+v_y dt), (t+dt)) = I_{GREEN}(x, y, t) \tag{10C}$$

Where $I_{RED}(x, y, t)$ denotes the intensity of red light as detected by a photo-sensor lying at the position (x, y) in a 2D image frame at time t, $I_{BLUE}(x, y, t)$ denotes the intensity of blue light as detected by a photo-sensor lying at the position (x, y) in a 2D image frame at time t, and $I_{GREEN}(X, y, t)$ denotes the intensity of green light as detected by a photo-sensor lying at the position (x, y) in a 2D image frame at time t, respectively.

Note that the above three optical flow equations (i.e. 10A-10C) are independent from one another (i.e. the signals are non-interfering). When the intensity of the red light beam changes, it will not affect the readout data of the blue and green optoelectronic sensor, and vice versa.

When the intensities of the respective light beams vary with x, y, and t in a very smooth way, Eq. (9A-9C) can be expanded in a Taylor series as Eqs. (11A-11C) below.

$$I_{RED}(x, y, t) + \frac{\partial I_{RED}}{\partial x} v_x dt + \frac{\partial I_{RED}}{\partial y} v_y dt + \frac{\partial I_{RED}}{\partial t} dt + H.O.T._{RED} = I_{RED}(x, y, t) \tag{11A}$$

$$I_{BLUE}(x, y, t) + \frac{\partial I_{BLUE}}{\partial x} v_x dt + \frac{\partial I_{Blue}}{\partial y} v_y dt + \frac{\partial I_{BLUE}}{\partial t} dt + H.O.T._{BLUE} = I_{BLUE}(x, y, t) \tag{11B}$$

$$I_{GREEN}(x, y, t) + \frac{\partial I_{GREEN}}{\partial x} v_x dt + \frac{\partial I_{GREEN}}{\partial y} v_y dt + \frac{\partial I_{GREEN}}{\partial t} dt + H.O.T._{GREEN} = I_{GREEN}(x, y, t) \tag{11C}$$

Where the H.O.T. stands for the "higher order term(s)", e.g. a $$\frac{d^2}{dt^2}$$

term. For example, when there is a rotational movement of the mouse body, the $$\frac{d^2}{dt^2}$$

term is no longer a term that is negligible. We begin with the situation where the non-linear term is negligible. Assuming that the brightness (i.e. reflectivity) of the reference surface does not change abruptly, Eqs. (12A-12C) will describe the behavior of each kind of pixel (e.g. red, blue, and green) that is receiving its radiation.

$$\frac{\partial I_{RED}}{\partial x} v_{x,RED\_PIXEL} + \frac{\partial I_{RED}}{\partial y} v_{y,RED\_PIXEL} + \frac{\partial I_{RED}}{\partial t} = 0 \tag{12A}$$

$$\frac{\partial I_{BLUE}}{\partial x} v_{x,RED\_PIXEL} + \frac{\partial I_{BLUE}}{\partial y} v_{y,BLUE\_PIXEL} + \frac{\partial I_{BLUE}}{\partial t} = 0 \tag{12B}$$

$$\frac{\partial I_{GREEN}}{\partial x} v_{x,RED\_PIXEL} + \frac{\partial I_{GREEN}}{\partial y} v_{y,GREEN\_PIXEL} + \frac{\partial I_{GREEN}}{\partial t} = 0 \tag{12C}$$

In differential geometry formulation, equations (12A~12C) can be written as:

$$\nabla I_{RED} \cdot v_{m,RED} + \frac{\partial I_{RED}}{\partial t} = 0 \tag{13A}$$

$$\nabla I_{BLUE} \cdot v_{m,BLUE} + \frac{\partial I_{BLUE}}{\partial t} = 0 \tag{13B}$$

$$\nabla I_{GREEN} \cdot v_{m,GREEN} + \frac{\partial I_{GREEN}}{\partial t} = 0 \tag{13C}$$

Where $$\nabla I = \left[ \frac{\partial I}{\partial x}, \frac{\partial I}{\partial y} \right]^T$$

is the image gradient at pixel [x, y].

Based on the principles of optical flow physics, when multiple light beams impinge on an image sensor (e.g. $I_{RED}$, $I_{BLUE}$, and $I_{GREEN}$ in Eqs. (13A~13C)), a plurality of optical flows are produced. Note that an optical flow can be generated by either physical objects or optical artifacts (e.g. light beams in different colors, shadows, etc.). Thus, the image sensor is able to take pictures of physical objects (e.g. particles on the reference surface) as well as the hue variations of the tinted reference surface. In the situation created by the present device, three kinds of colored light rays (i.e. light of different wavelengths) impinge on the reference plane. More than three kinds can be used, but are generally not necessary. After reflection, the color image sensor embedded in the cavity of the navigational device will detect three "hue flows" on its pixel plane (where "hue flow" designates an optical flow per a specific wavelength of light). Of course, the device can use alternative methods, such as light beams in three different polarities (polarizations), UV or IR light, lasers, different phases, etc. to obtain similar results. Methods as these are essentially using the same spirit taught by the present invention.

If we investigate these optical flows further, we will discover that each of them can produce an image gradient in accordance with a hue profile (hue variations along the surface) that is largely determined by the tinting condition of the reference surface (or whatever surface treatment is used to affect polarizations, etc.) as well as the spectral distribution of the respective light sources. Thus, using Eqs. (13A-13C), one can derive three sets of motion vector data from the navigator.

As was stated above, the planar reference surface used by the navigator has been "tinted" with three colors (so, we may call it a colored mouse pad), which can be done by physical means, chemical means, or optical means. As a result of the light reflectance property of the tinted reference plane, the reflected light beams from the reference plane project three independent optical flows onto the image sensor. Since each light flow represents a predefined image gradient in a specific color (or, using alternative methods, polarization, phase, etc.), the three color index data (e.g. CIE 1931 RGB) of the colored reference plane (i.e. the mouse pad) will vary from place to place independently. As a result, the color-sensitive image sensor in the navigator is able to detect the variations of color index in an effectively "orthogonal" (i.e., independent) manner, so that the orthogonal color index data are all mapped to the geographical position of the reference plane. As a result of this unique capability, the present system is able to establish a "geographical map" based on the color index data acquired from the "tinted" reference plane. The color index (e.g. CIE 1931 RGB, etc.) serves as an ideal data source by which the navigator can ascertain its absolute whereabouts on the "tinted" reference plane. Thus, the positional data [X, Y, Z] of Eq. (1) can be determined. The navigational device may still use metrical methods (e.g. BMA) to trace objects on the reference plane (e.g. particles, surface morphology or other topological features); these microscopic objects are so small that they will not affect the apparent color of the reference plane and they can be used independently and simultaneously to obtain relative motion vectors. As U.S. Pat. No. 9,733,727 teaches, the navigator is able to measure the translational and rotational motion vectors by the relative movement between the navigator and the targeted objects lying on the reference plane. In addition to the method used to convert the hue data to the 3D positional data, the present navigator is able to determine translational motion vector $[T_x, T_y, T_z]$ and rotational motion vector $\omega$ concurrently through surface features.

We would now like to highlight the importance of positional accuracy to implement a graphical design rule that is vastly different than that of the conventional art: the physical alignment of the navigator and graphic rendering device. This is an issue that has been largely ignored in the prior art. When the optical mouse was invented, there was no need for the operator to align his/her hand movement to that of the cursor on the screen. Today, as graphical rendering technology becomes increasingly used in a wide variety of applications, a mouse can be used by a graphic artist or a surgeon. People in these professions rely on finesse to perform their jobs, so the mouse they need is one that aligns their hand movement to that of the cursor on the screen. If one uses Eqs. 11A through 11C to understand these new requirements, it implies the H.O.T of each equation can no longer be ignored. By extensive practice, for example, an operator who is a cartoon artist can become so familiarized with the effects of his/her hand movement (comprising mostly linear terms and H.O.T.) in a predefined coordinate system, that the "creature" he/she generates can be effectively "mapped" onto the graphics system by the neural functions in the operator's brain.

In graphic work, typically the renderings from the same artist may have an identifiable "genre", created by the delicate gestural movement (i.e. precisely the H.O.T. of Eqs. 11A-11C) of the artist. Today's motion trackers (both 2D and 3D) have ignored the importance of these H.O.Ts in creating such identifiable subtleties and nuances of an artistic rendering.

The present system not only performs metrical comparisons using BMA, but also measures hue variation. In a targeted pixel block, the variation of hue corresponds to the H.O.Ts of Eq.s 11A, B, and C. Thus, the non-linear motion of the operator's hand can be used for delicate motion control of the computer cursors. Because of the way the presently disclosed navigational system "tints" the reference surface, each geographical point is allowed to reflect light to produce a unique color index parameter; when taken together, all these color index data generate a 3D space. This is the first time in the industry that a navigator and its planar reference surface have a built-in coordinate system. In the past, the graphical object, (e.g. a cartoon creature) as seen in an animated art movie, is generated by mathematical programs instead of an artist's hand. As a consequence, today's digital cartoon has disengaged itself from the genuine creativity of the artist. As a result of the upcoming revolution of 3D graphic art, an imminent demand will emerge for the electronic industry to develop a new navigation device that "aligns" the data streams between two "central processing units", the computer's CPU, and the human brain of the artist/operator. In the process of delivering motion vector data in the computer, the presently disclosed navigator provides electronic signals for the computer. Simultaneously, a similar process takes place in the operator's brain; it is the nervous system of the operator that transmits the positional data of the presently disclosed navigator back to the brain. The latter operation is not explicit to human eyes (especially the H.O.T., the non-linear motions). But indeed the H.O.T. has much to do with how the smoothness and agility of motions are transmitted to the rendering device. When an artist uses the presently disclosed navigator, through familiarization by repetitive practice, the individually recognizable quality of his/her work can be demonstrated and visualized through subtleties of the sketching, calligraphy, drawing, etc. In the past, it was exactly these artistic nuances that were responsible for bringing human civilization into modernity. In most of the hand-held navigators we find in the mass market today, the above described product design concept is often confused with "ergonomics". But that term refers only to ease of long term use and energy expended by the user. It does not adequately describe the brain-to-hand transparency provided by the present device. Today a consumer can easily find some so-called 3D motion tracker in the electronic market. But that product may not necessarily have the key feature of alignment as stated above, which is required by the human brain for subtle, nuanced and sophisticated work (e.g. surgery, painting, etc.). There are some motion trackers that use optical means, magnetic means, electro-mechanical means, or electromagnetic (EM) means. These products still ignore the issues of alignment; almost all of them have a generic drawback, the natural vibration caused by human hand/body has not been addressed, and the non-linear portion of operator's hand cannot be measured reliably. FIG. 13A shows the vibration model of a human body being seated, with one hand gripping an object (e.g. a motion tracker). The entire skeleton of human body is like a mechanical frame bolted together by many springs. FIG. 13B shows another vibration model for a human body being in the standing position. The magnitude of the vibrations will change when the attitude and gestures of the human body changes. Industrial surveys reveal that difficult gestures yield even larger positional errors than the easy ones. When an operator uses a 3D motion tracker as shown in FIG. 11 to maneuver an object in the displaying device that requires high positional accuracy (e.g. medical images, mechanical drawings, etc.), these 3D motion trackers may fail to meet the stringent requirement of sophisticated applications. As of such, although there are some 3D motion trackers being sold in the mass market (e.g. NINTENDO Wii, Microsoft Kinect, etc.), their applications have been largely limited to video games or other applications that do not require high positional accuracy. The presently disclosed navigator is mechanically supported by a reference surface, so the influence of hand vibration on said navigator can be suppressed; this makes the present navigator one of high sensitivity and high resolution.

We have cited three major advantages of the present system in the above paragraphs:
1. deriving 3D motion vector data from a 2D reference plane,
2. providing absolute addresses in high sensitivity and high resolution mode for sophisticated 3D applications, and
3. the ability to detect non-linear motion reliably.

A fourth advantage of the present invention has to do with scaling. If an optical mouse has a scaling capability, it is equivalent to saying that the image captured by the optical mouse has a "depth of view" or "depth of field" on the reference plane. Expressed mathematically, for the same amount of displacement on the planar reference surface, depending on the scaling factor, the positional readout of the presently disclosed navigator will be made to vary. In conventional art, as FIG. 1 shows, the same geographical point on the reference surface (i.e. the mouse pad) may only yield one 2D address (x, y). In the present system, because the 3D data can be controlled by the hue data; the same position can yield different 3D address. As FIGS. 10A and 10B show, the depth value of cursor (1004A) can be changed from literally zero to minus infinity ($-\infty$) when the cursor moves from the address of point (1004A) to that of point (1001A). On the reference plane (1006), it denotes a path (not shown) that comes across a unique point, which corresponds to what we call the point of minus infinity or the vanishing point. At this point all objects will appear as a dot. Conventional cursor maneuvering devices do not have this feature; they do not have a vanishing point (although the 2.5D or 3D graphic rendering devices do) within the scope of device movement. Limited by such a shortcoming, the range of movement used by today's motion tracker on its reference surface is not aligned with the corresponding movement of the cursor displayed in the displaying device. The present system uses three optical flows to denote the absolute address on the reference plane. Hence, the present system is able to designate a point on the reference plane as the vanishing point in the 3D graphic display. While the navigator is maneuvering on the reference plane, the z value changes in accordance with variation of tinting condition of said reference plane at all times. Though hand maneuvering actions, the above feature allows the operator to gain a feeling that he/she is navigating an object in a 3D space that has six degrees of freedom: +X, −X, +Y, −Y, +Z, −Z.

The cursor maneuvering devices used by the consumer electronic industry today is well behind what the system invention offers. There are many occasions where even a simple movement as shown on a 2.5D or 3D device requires multiple movements of the cursor maneuvering device (e.g. zooming in and out). Once a simple movement of a displayed object has to be dissected into multiple steps for a cursor maneuvering device, the human brain may easily lose valuable clues with which to analyze the motion he/she sees in the displaying device. As was previously stated, such an analytical capability of human brain is the origin of creativity, an essential value of modern human civilization.

"Vanishing point" is not just a phrase used by graphic artists; it has to do with the professional work associated with the computer or electronic system that has a graphic displaying device (e.g. 3D graphics, surgery robot, etc.). Perspective in a sketch adds realism to the three-dimensional representation. The fundamental rule for a perspective sketch is that parallel edge lines converge to a single point (the vanishing point) on the horizon. If there is just one vanishing point, then this sketch is called a one-point perspective sketch. If two sets of parallel edge lines converge to their respective vanishing points, then it is called a two-point perspective sketch. There is also case of three-point perspective, in which all vertical lines converge to a point. The present system relies on three ways to manipulate the location of a vanishing point, i.e. the tinting condition of the reference plane, the illuminating condition of the light source, and the image capturing process scheme (e.g. shutter speed, duration, etc.). Conventional cursor maneuvering devices do not provide such a vanishing point on their reference medium (e.g. mouse pad); the operator's hand gesture cannot be directly aligned to the coordinate system displayed by the graphic rendering device that has vanishing point(s). An ideal 3D cursor maneuvering device provides an element of "finesse," by allowing the operator to coordinate his hand and eye movement by means of a coordinate system that "aligns" the scenery that he sees on the display to what his hands are doing on the mouse pad. The above feature establishes the future fundamental difference between a professional navigator and a commoditized one.

Based on the above illustration, we understand that today's electronic industry needs a navigation device that not only provides 3D orthogonal positional data (i.e. in (x, y, z) format) with high positional accuracy, but also a device that is capable of designating at least one vanishing point on the reference plane/space. With all these features included in one embodiment of such a navigation device, there is one additional feature needed for high sensitivity and high resolution purposes: the navigational device must be immune from human body vibration.

The present navigation device has two working modes, 2D and 3D. The data generated in one mode can be correlated to the one generated by the other mode. When working as a 3D cursor maneuvering device, as schematic FIG. 15C shows, the color sensitive feature of the 3D optical mouse (1512) will be activated and a tinted mouse pad (1613) will be used in conjunction with the resulting color sensitive optical mouse (1612). During its operation in this mode, the 3D cursor maneuvering device (1512) shines multiple light beams of different wavelengths onto the tinted mouse pad (1513). These multiple beams may irradiate a targeted object from different directions. A color image sensor (not shown in FIG. 15C) embedded in the optical mouse (1512) is sensitive to the light beams in their respective wavelengths, which are transmitted back to the sensor (e.g., by reflection). Hence, the tinted mouse pad (1513) and the optical mouse (1512) work in collaboration as a 3D cursor maneuvering system.

When placed on an ordinary desktop surface instead of the tinted mouse pad (1513), the same cursor maneuvering device (1512) works as a 2D optical mouse. Selection of the 2D mode can be made manually or automatically. It must be noted that regardless of whether its 3D or 2D mode is being used, the cursor maneuvering device (1512) itself (not the cursor on the displaying device) only moves on a two dimensional plane (e.g. the desktop surface or tinted mouse pad). This unique capability gives an extraordinary advantage to its operators, who can easily use the navigational device in a professional office environment, since the actual motion of the device remains the same in both modes. The conventional 3D trackers (e.g. the stick (1105) shown in FIG. 11) are not user-friendly within the office environment.

The color image sensor embedded in the 3D optical mouse (1512) also offers two other unprecedented advantages, high resolution and high sensitivity. A modern digital image sensor can easily capture thousands of images in one second; the number of pixels in an image sensor can easily be in the millions, although such an amount is not required by the present system. The present navigational device provides the resolution and high sensitivity 3D cursor maneuvering to take advantage of these properties. There is yet one more benefit that accompanies these high resolution and high sensitivity features: a perspective sketching capability. This seemingly easy but actually difficult method of sketching is extremely important to next generation 3D graphic art rendering devices or 3D printer (some reasons have already been given, others will be explained in the latter sections); yet it has not been accomplished by the prior art.

As we have already noted above in our discussion of the vanishing point, perspective sketching is the foundation of modern graphical art. In a perspectively sketched drawing, objects located in remote space are drawn smaller than the ones that are located closer to the viewer. Hence, referring to FIG. 6A, within the image frame (608A), object (602A) will appear larger than object (604A), despite the fact that (604A) and (602A) are actually two objects with the same physical size and shape. This rule of sketching can be applied to the whole picture. When an object is placed at infinity, its apparent contour will shrink to a dot (e.g. point 601A). This point is the vanishing point that was already discussed; all objects in the image frame (608A) will now be sketched in such a way that their horizontal contour lines (e.g. lines (605), (605') and (605")) merge at a vanishing point (601A). The above stated technique, which defines perspective sketching, was developed in or about the time of the Italian Renaissance era. Through centuries of subsequent development, this technique has become a mature and common means of sketching which is used by almost all digital graphical rendering devices today (e.g. flat panel displays having 3D graphic rendering capability). On the other hand, over the years, cursor maneuvering devices have not developed as much; what most people use is still a 2D optical mouse. The presently disclosed navigator device closes this gap.

To illustrate the merit of the presently disclosed navigator with regard to said perspective sketching capability, an exemplary scenario is depicted in FIG. 16A, in which several 3D objects (i.e., object 1, 2, and 3) are placed in a world coordinate system W, which is further being perspectively perceived by a camera coordinate system Q. Let $\vec{Q}$ be the vector denoting the position of a point Q with regard to said world coordinate system, and $\vec{T}$ be a vector denoting the position of a targeted object (say, object 1) with regard to the camera Q. From basic vector algebra, one may find that the unit vector of said coordinate system of world, which can be denoted as $\vec{W}$, shall comply with Eq. (14).

$$\vec{W} = \frac{T - Q}{|T - Q|} \quad (14)$$

If a device engineer has a mean to imprint the world coordinate system (denoted by its unit vector $\vec{W}$) onto his mouse pad (in other words, the coordinate system W' is only meant for the perception of the presently disclosed cursor maneuvering device, or for operator's hand to "feel", but not for human eyes to perceive), then all the objects (object 1, 2, and 3) can be literally transcribed from the memory of computer or electronic system to said mouse pad (e.g., 1601A). Thus, as FIG. 16A shows, it is interesting to notice that now both the camera Q and mouse pad (1601A) can have their own 3D coordinate systems, on which there lies their own vanishing points (not shown in FIG. 16A, shown in FIG. 16B).s FIG. 16B shows an exemplary case that the entire scene of a graphic rendering device (not shown) has been "trans-printed" to a mouse pad (1608B). The readers must be specially advised that said trans-printed scene on said mouse pad (1608B) is an imaginary one—it may not have the color or contour as our eyes normally perceive. All the present invention means here is that each of the geographic points thereon can find a corresponding one on the graphic displaying device, and vice versa. Hence, point (1601B) shall denote the vanishing point of the reference plane (1608B). One may notice that some contour lines of the objects also get their corresponding sketching lines trans-printed on the mouse pad (1608B), i.e., (1602B) and (1603B). These "sketch lines" may be visible or invisible to human eyes. What these lines tell us is that the reference plane (i.e., mouse pad 1608B) can provide 3D data in accordance with a pre-defined perspective angle. In certain situations, however, the perspective angle must be adjusted in a timely manner. As an exemplary case of using the presently disclosed cursor maneuvering device to adjust the perspective angle, FIG. 16C shows that the operator maneuvers his/her finger (1604C) on the touch sensing feature (1605C). When the finger (1604C) is moved to the left of the central line (1606C), said touch sensing feature (1605C) will acknowledge the computer or electronic system to adjust the perspective angle accordingly. Almost simultaneously, as FIG. 16B shows, the "imaginary" vanishing point (1601B) of the mouse pad (1608B) has been moved leftward as compared to that of FIG. 16D. By the same token, as FIG. 16E shows, when the operator's finger (1604E) moves to the right of the central line (1606E), the position of the vanishing point (1601D) on the mouse pad (1608D) changes accordingly. What the presently disclosed cursor maneuvering device really do is that, when the computer or electronic system desires to change a perspective angle, it acknowledges the presently disclosed cursor maneuvering device. By providing the displacement of operators' finger on the touch sensing device (1605C or E), a perspective angle moving instruction plus the corresponding data is sent to the computer electronic system for the above stated purpose. In the meantime, the presently disclosed-cursor maneuver device can calculate the new address for said vanishing point (i.e., 1601B or D) on said tinted mouse pad (1608B or D). Accordingly, a new set of hue data can be determined for said process. It is now clear that a "tinted" mouse pad as is disclosed by the present invention plays the vital role to the next generation 3D perspective computer graphics. Note that the above processes can all be done by the wiggling act of the operator's finger instead of moving the body of the presently disclosed cursor maneuvering device (e.g., 1607C, 1607E). When an operator moves the presently disclosed cursor maneuvering device (e.g., 1607C, 1607E) on the tinted mouse pad (e.g., 1601A), the situation can be very dynamic—there are 3D motions for the objected selected as well as perspective angles adjustment, these incidents may take place by one gestural movement of operator's hand/finger (although the internal clock of the presently disclosed cursor maneuvering device may separate the tasks into different working durations). In one possible scenario, both the object (e.g., object 1, object 2, and object 3 in FIG. 16A) and the world coordinate system W shall move. In another, the object is moved first, and a world coordinate system change takes place shortly afterwards.

Professional artists are trained to draw objects on the sketch paper in accordance with the rules of perspective sketching. Since the sketching pen itself does not have a coordinate system, the artists have to rely on a lot of practices on the sketching paper to familiarize his hand movement with the 3D perception that he desires to put on paper, just as FIG. 17 shows. When an artist moves his/her work place to the computer, his/her brain controls the neurons that links to eyes and hands. The brain can construe neuron signals from the eyes and hand (fingers, wrist), and the come out with some curves, figures, patterns, etc. The above stated cartoon character Ariel is an example. In practical world, there is no such a mermaid at all. So, there comes a demand from the graphic artist for a 3D cursor maneuvering device that combines the artist's will and hand gesture movement to render a beautiful cartoon. As was stated earlier, this kind of demand did not exist at the time the optical mouse was just invented, it only become an imminent demand after the graphic rendering technologies had reached a certain level of maturity in about the last decade.

Because the presently disclosed system effectively carries a 3D coordinate system on the tinted mouse pad, it offers a genuine ergonomic advantage that prior art does not have, particularly from the point of view of an artist. FIG. 17 is the sketch of a cartoon girl. The viewer may quickly get a perception that this girl is beautiful, having a good facial structure despite some of her details are still missing (e.g. eye balls, lips, etc.). To infuse an aesthetic feeling to a graphical object as such, the strokes of the artist (note they are in 2.5D coordinate system) play the vital roles. Hence, it is the alignment process between the mouse operator's eyes and hand that matters. This is contrary to the conventional optical mouse whose design is focused on aligning its positional accuracy with the graphic displaying device. As has been stated above, generating a 2.5D stroke on a graphic displaying device is not difficult, generating a 2.5D stroke by a navigator that allows the operator to analyze the result in the displaying device and adjust his/her hand to generate a stroke that represents his feeling better in the next trial is difficult. To sketch just one stroke beautifully, an artist has to practice so that his/her hand movement gradually responds to the aesthetic feeling in his/her brain. As the rough sketch in FIG. 17 shows, the girl's hair has been drawn as several separate lines (1701) and (1702), each sketch line represents a trial process of the artist to produce the final acceptable affect. During the course of hair curve sketching, the artist gradually familiarizes/aligns his/her hand movement to what his brain wishes to convey. To support an artist who is attempting to do the same on a computer, the navigational device must have an "implicit" coordinate system, one that is not actually visible to the eye, that the artist can "memorize". In most cases, the computer does not know the existence of such a coordinate system. But when the operator moves the navigator on its reference plane, its existence will be clearly felt in terms of the result. Thus, throughout the entire maneuvering process of the presently disclosed navigator, a 3D coordinate system is always projected onto the "envisioned" sketch paper (i.e. FIG. 17), with or without the artist's acknowledgement by eyesight.

As has been stated above, the computer industry has entered an era in which the cursor maneuvering device must be capable of perspective sketching. The capability of taking data from a glossy surface may no longer be the key performance metric. In modern digital graphic art utilities, the "place" where the artist's sketch pen swiftly flies across the paper corresponds to the reference plane of the cursor maneuvering device, i.e. the mouse pad. Conventional cursor maneuvering devices (e.g. the roller ball type, turning knob type, or optical type, etc.) do not have such a 3D reference plane; there is no direct means to map the respective points in the reference medium to the pixels in the 3D rendering devices, and, thence through the artist's neurons, back to his/her human brain.

We learned from the history of art in human civilization that an ideal 3D cursor maneuvering device should allow the operator to control his higher order hand movements in a 3D coordinate system that lies on a 2D plane, so that hand vibration, jittering, etc. can be suppressed. Such a 3D coordinate system can be mapped by its user to (or between) two image frames, the image frame associated with the computer, and the image frame that is created by a plurality of "neuron signals" that are in the user's brain. These are fundamental characteristics that differentiate the present system from the prior art. To reiterate, what we refer to as a reference "plane" need not necessarily be a 2D space. As professional artwork since renaissance times has demonstrated (FIG. 17), a 2D reference plane (i.e. the canvas or sketching board) can provide a realistic 3D perspective rendering effect to human eyes, so long as there is a stable vanishing point on it (much like point (1601B) is to the mouse pad (1608B)). Thus, we come to the realization that a reference plane that carries the "absolute" positional address of the respective geographic points thereon, or any means/device with equivalent effect, is a key feature of the next generation 3D navigation device. And that is precisely a feature of the present navigational device.

The merits of using a 2D reference plane with a vanishing point on it can be demonstrated by FIG. 18 and FIG. 19. FIG. 18 is a cartoon made by hand sketching. FIG. 19 is a cartoon created by a digital graphic art rendering devices (e.g.

graphic processor, such as NVIDIA®'s graphic processor). As FIG. 18 shows, the sketcher used different curves to present the 3D gesture of the dancers. FIG. 19 does not have this characteristic. Although the general appearance of the cartoon in FIG. 19 is sleek, modifying this cartoon object (FIG. 19) in accordance with the artist's desires is not easily done as there is no coordinate system for the mouse used. If a graphic artist desires to change the gesture of the rabbit in FIG. 19, then the entire graphic art rendering system must go through a complicated process comprising object database management, vertex mapping, texture mapping, polygonal mapping, and shadow generation, etc. For a graphic artist, creativity is often developed by the alignment process between eyes and hands rather than by the generation of mathematical curves (most of the curves in FIG. 19 are generated by mathematical means). If a cursor maneuvering device does not support the artist in his task of directly relating his/her hand movement to the results produced, then the quality of the work will be limited by a lack of spontaneity. In other words, the artistic creativity, the most valuable and human part of a work of art, has been sacrificed by the shortcomings of the conventional cursor maneuvering device (both 2D and 3D types). Thus, there is a need for the electronic industry to develop a 3D cursor maneuvering device that facilitates perspective sketching.

Of course, there are still many operations in the real world that require not the operator's creativity but the device's resolution. For work that requires high resolution (e.g. AUTOCAD® drawing, medical images), the presently disclosed navigator also has the required capabilities. These are attributed to the hue images of the targeted microscopic objects on the desktop surface. The apparent color of an object (e.g. a dust particle) can be changed by using different incident angles of the variously colored light rays (note that when a mouse moves, the relative position of the targeted object and the image sensor embedded in the mouse changes, consequently the incident angle of the respective light rays of different colors changes). Calculating the translational motion vector as well as the rotational one by the method taught herein is far easier, from an algorithmic point of view, and more precise, as compared to that of prior art.

BRIEF DESCRIPTION OF THE DRAWINGS

This disclosure will be described with reference to the accompanying drawings, wherein.

DETAILED DESCRIPTION

Figure 15A:
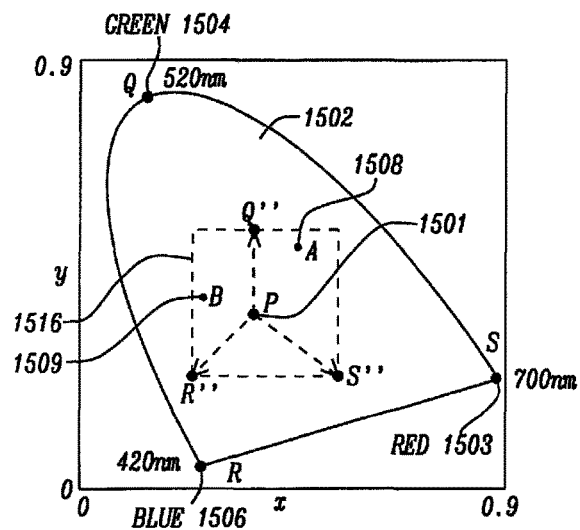
FIG. 15A-15F schematically depicts an exemplary color gamut on a tinted planar reference surface and the formation of a corresponding 3D coordinate system that can be represented (i.e., mapped into) by this gamut using the present system.
Figure 15B:
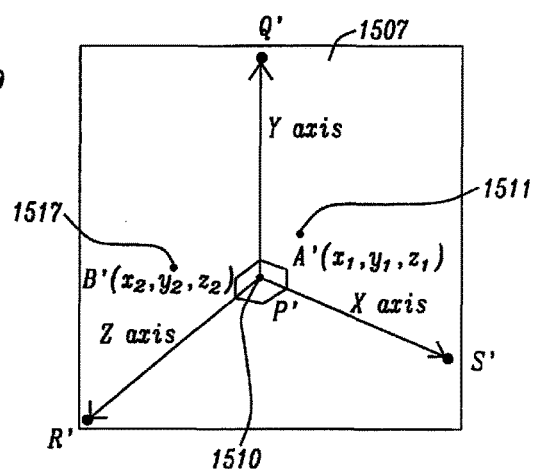
Figure 15C:
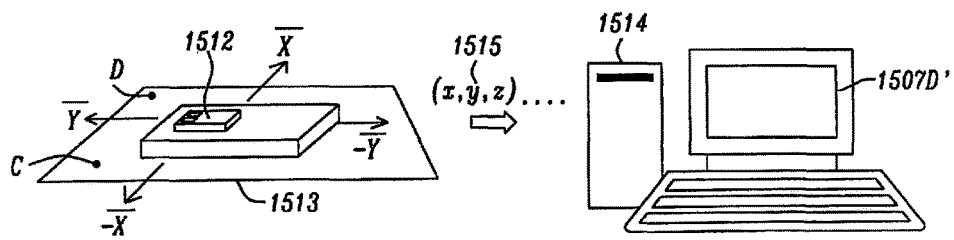
Figure 15D:
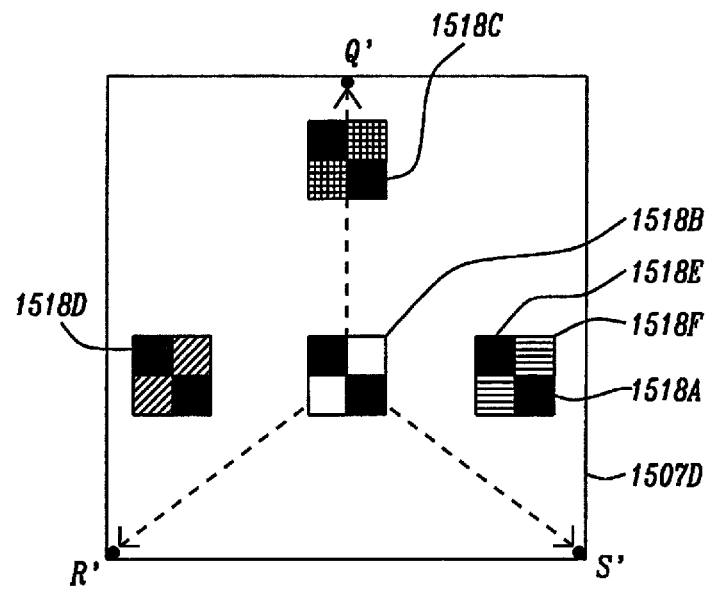
Figure 15E:
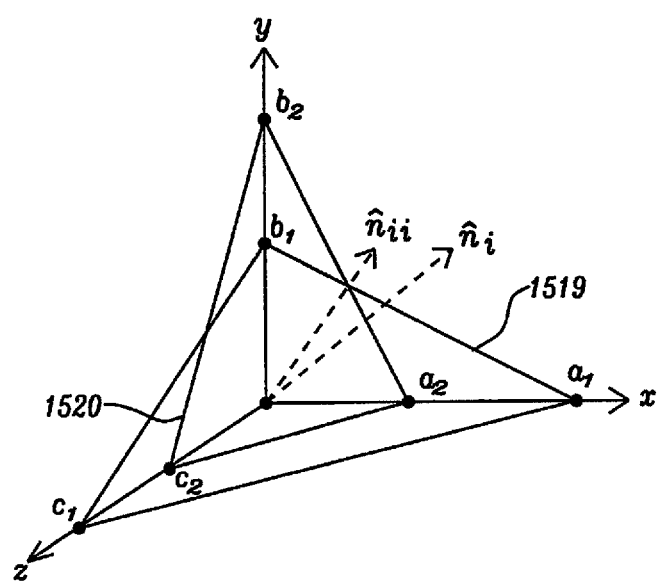

Referring to schematic FIG. 15C, the presently disclosed 3D navigating system is shown as consisting of a movable device (1512) (alternatively denoted a navigational device, a navigator or an optical mouse) and the specially tinted reference surface (1513) on which it moves (alternatively referred to as a tinted or colored mouse pad). By the term "3D", is meant that the presently disclosed system, (1512) plus (1513), is able to support an electronic visual display (1507), typically controlled by a computer (e.g. 1514) on which a 3D object, cursor, or scenery can be maneuvered using a data set comprising three or more parameters (e.g. x, y, z, θ, etc.). In practice, these parameters can be used not only to produce translational motions, but also rotational motions and, in some instances, to produce special effects. Note that for a high performance navigational system as disclosed herein, all 3D motion vectors (e.g. translational, rotational, scaling, etc.) will preferentially be produced by a single gestural movement of the operator and, in fact, any cursor maneuvering that takes more than one gestural movement to complete would be considered redundant and non-ergonomic. The extraordinary capability of the present system in providing a plurality of parameters by which to move a 3D object by one gestural movement of the operator is achieved by use of a tinted reference surface (1513) and a color sensitive optoelectronic sensor (e.g. color CMOS image sensor or the like) which is embedded in the presently disclosed navigation device (1512). We repeat, however, that the term "tinted" can apply to any treatment of the surface that affects incident electromagnetic radiation by reflecting it, re-emitting it, changing its wavelength, phase or polarization in a manner that permits independent use of several non-interfering waves captured by the optoelectronic sensor.

Referring again to FIG. 15C, the surface of the reference plane (1513) has, in this example, been "tinted" by some method of coloration (e.g. by red, blue, and green dyes/pigments for this case, or by alternative methods with equivalent effects for other cases) to allow each point on the reference plane to direct light of different wavelengths to an embedded image sensor. In fact, this can be done using methods other than reflection that have similar effects, such as interference, refraction, fluorescence or absorption and re-emission. On the reference plane (1513), the variation (i.e., intensity, hue) of each coloration material has a pre-defined profile (i.e., a surface pattern) that can be recognized by the image sensor embedded in the movable device (1612). In an exemplary case, the reference plane is coated by the coloration method in three pure colors (e.g. red, blue, and green, etc.). To fabricate this type of tinted planar reference surface, the device engineer may use a plastic sheet on which three spots are dispersedly positioned (not shown in FIG. 15C), where the spots are doped with some given concentration of red, blue and green dyes/pigments that permit reflection at various intensities. The remaining points on the reference surface can be doped using lower amounts of the dyes/pigments, but they are no longer in one pure color as the three spots are, the dyes/pigments are thus in a blended mode in the remaining area. Thus, every geographic point on the tinted mouse pad will be colored by a unique combination of the three pure colors in accord with the varying blending ratio of the three dying materials. It should be easily understood that the other tinting methods may also be useful, but for the simplicity of explanation, this embodiment uses red, green, and blue dyes/pigments.

Figure 1:
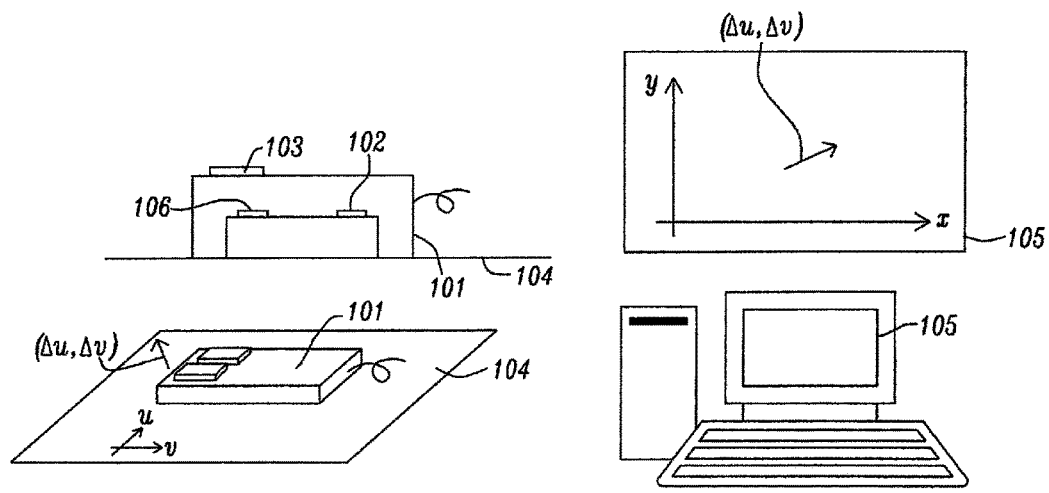
FIG. 1 schematically depicts the structure of a conventional optical mouse and an associated computer; the mouse only provides two dimensional relative motion vectors (i.e. no absolute addresses) for the computer to use.
Figure 2:
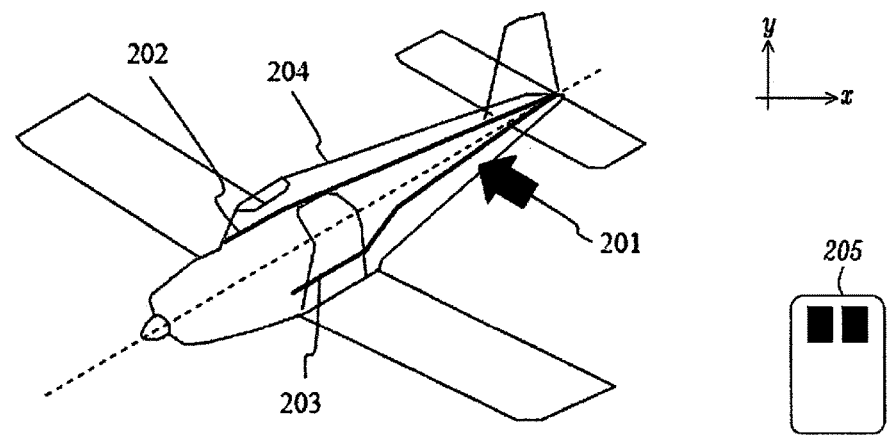
FIG. 2 shows, schematically, an artist's rendering of an airplane model in a "2.5D" coordinate system, i.e., each of the respective points on the airplane fuselage has a depth value and there is a separate rotational axis.
Figures 3A, 3B:
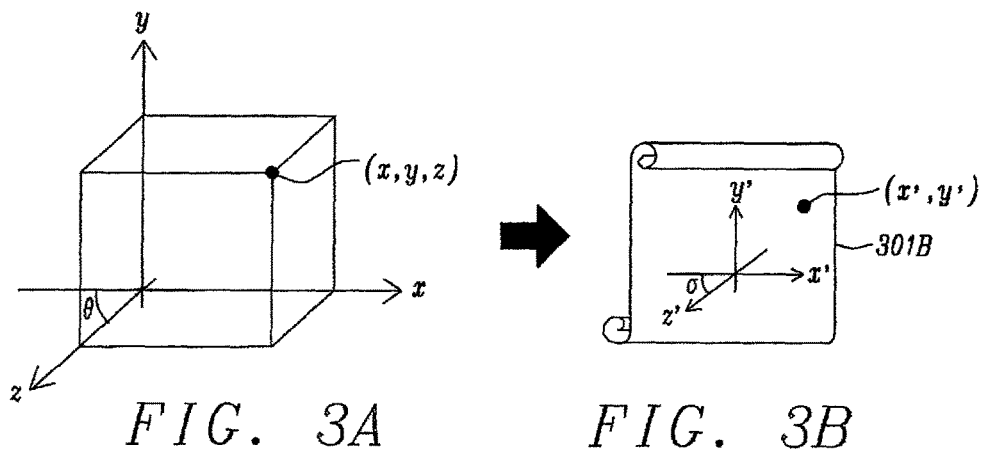
FIGS. 3A and 3B show, schematically, how a 2.5D coordinate system depicts a 3D object on a planar displaying device.
Figure 4:
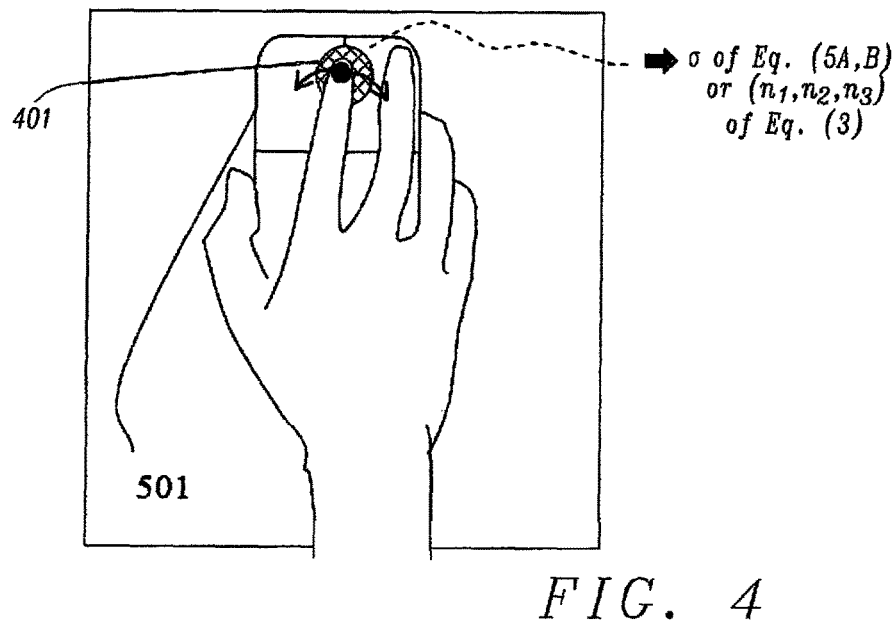
FIG. 4 schematically shows the present device being manipulated to make use of the plane-tilting function.
Figure 5:
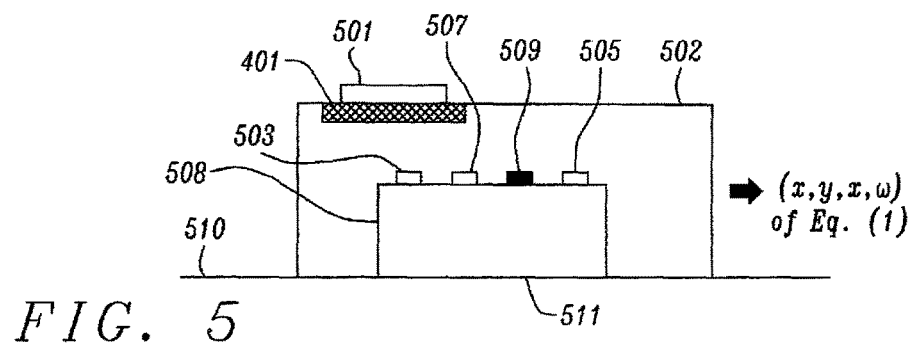
FIG. 5 schematically shows a cross-sectional view of the present device, such as the device being manipulated in FIG. 4.
Figure 6A:
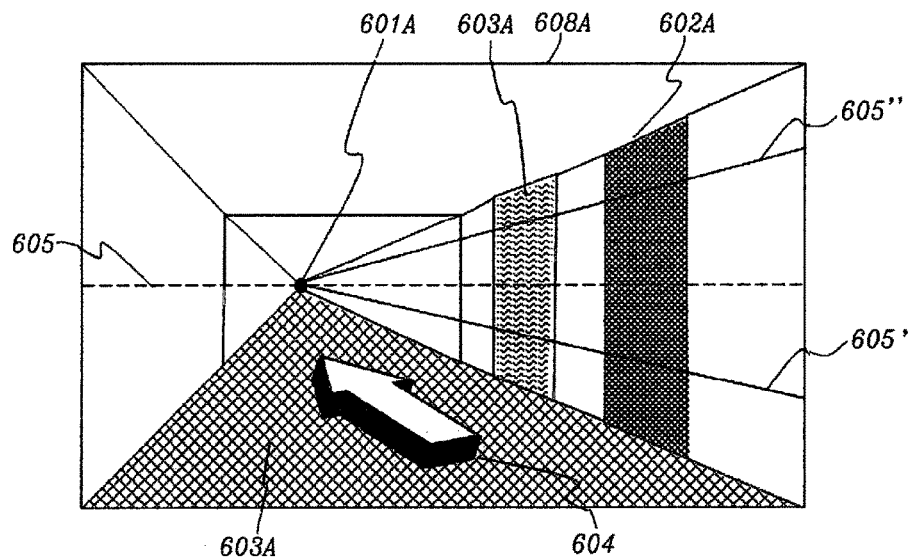
FIG. 6A-6C shows, schematically, how a cursor can be made to move along a plane of motion in a 3D coordinate system by the present navigational system.
Figure 6B:
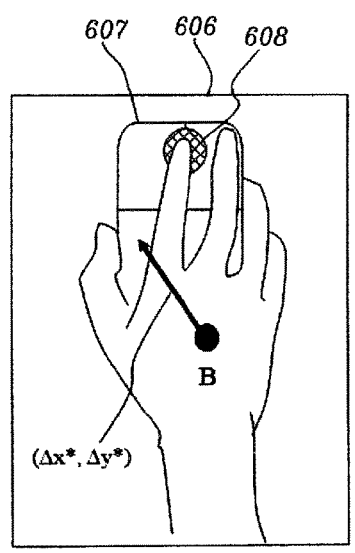
Figure 6C:
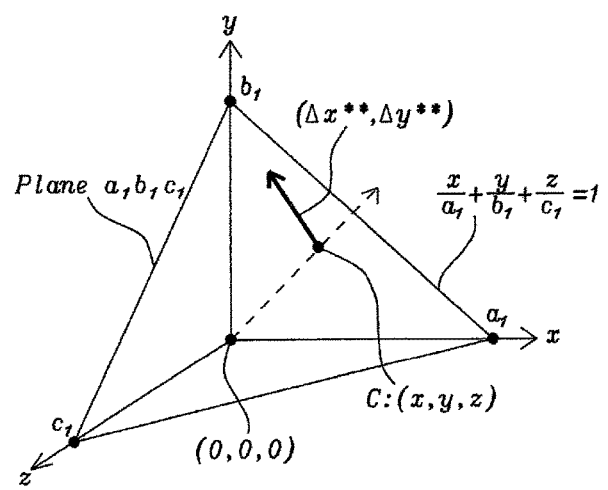
Figure 7A:
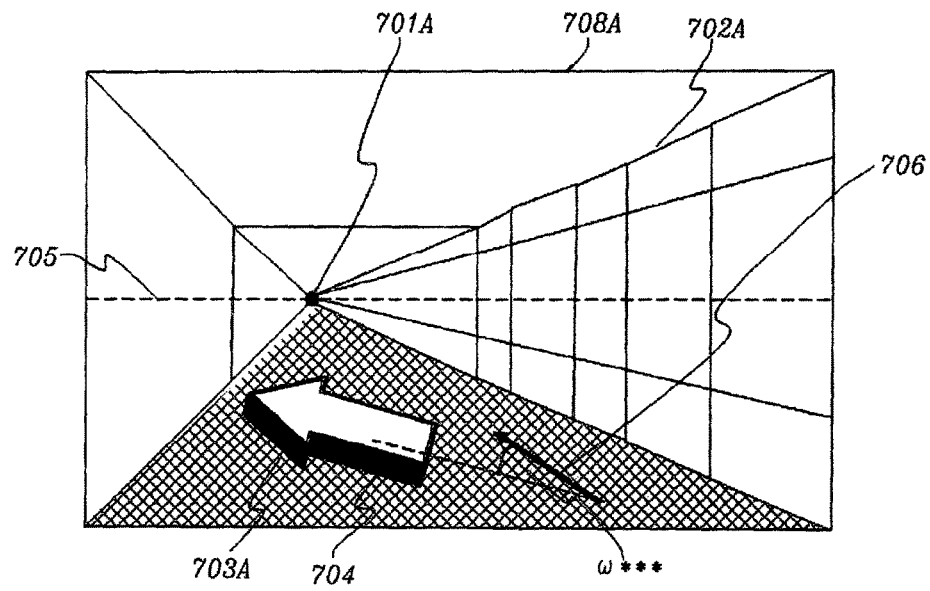
FIG. 7A-7C schematically shows how a cursor can be made to rotate a plane of motion that lies in a 3D coordinate system.
Figure 7B:
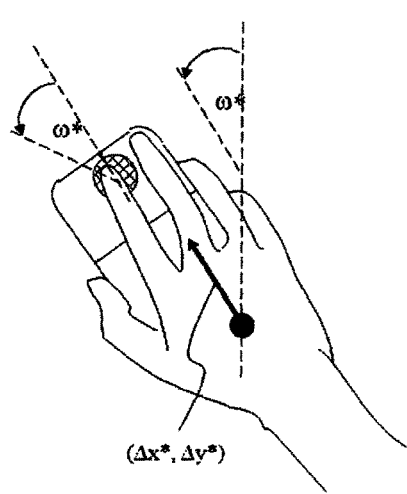
Figure 7C:
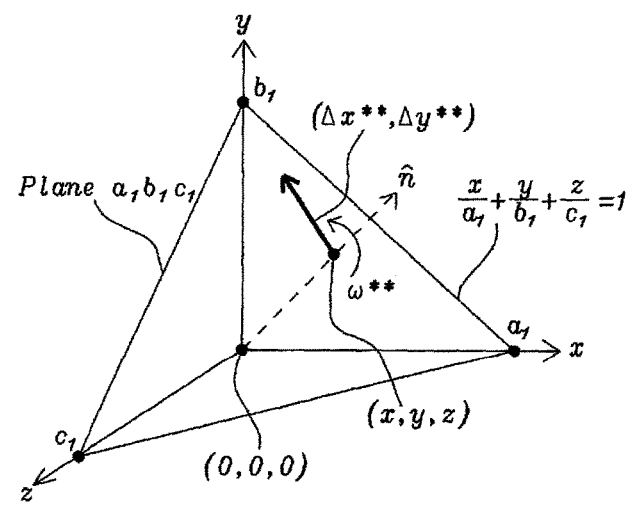
Figure 8A:
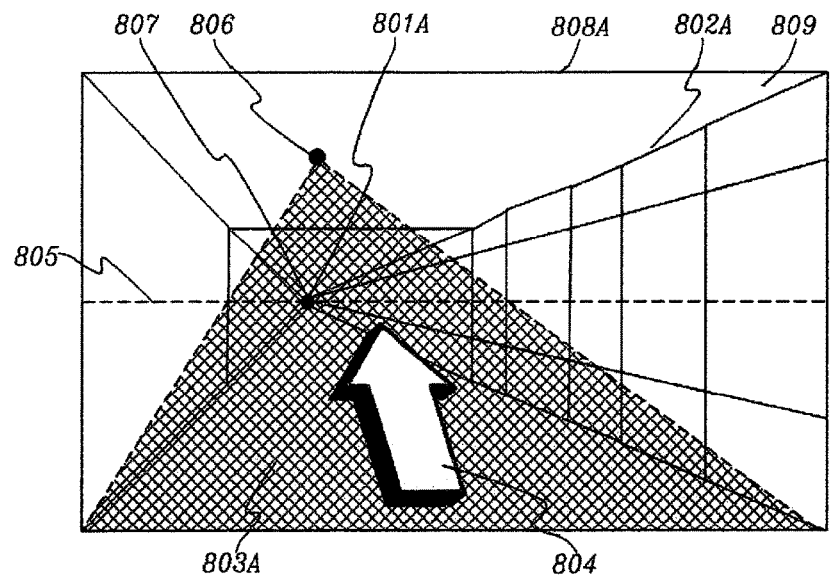
FIG. 8A-8C schematically shows how cursor motion can take into account a change in vanishing point.
Figure 8B:
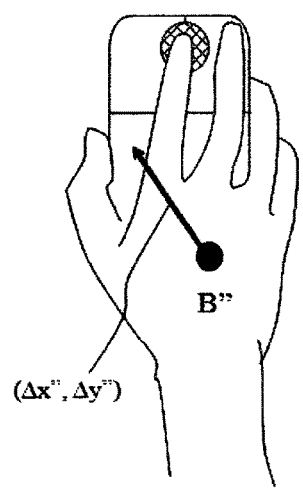
Figure 8C:
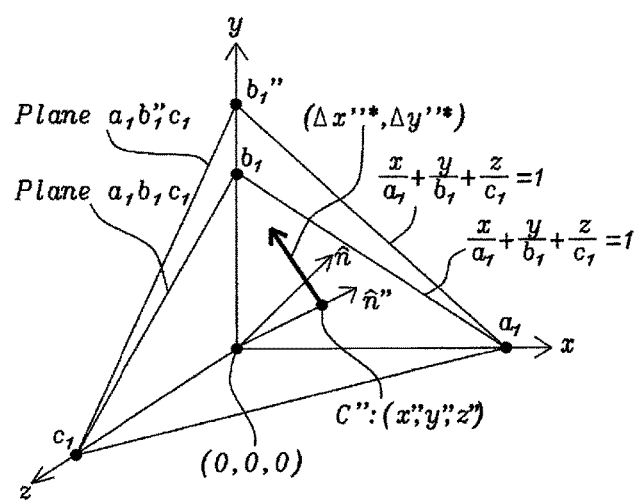
Figure 9A:
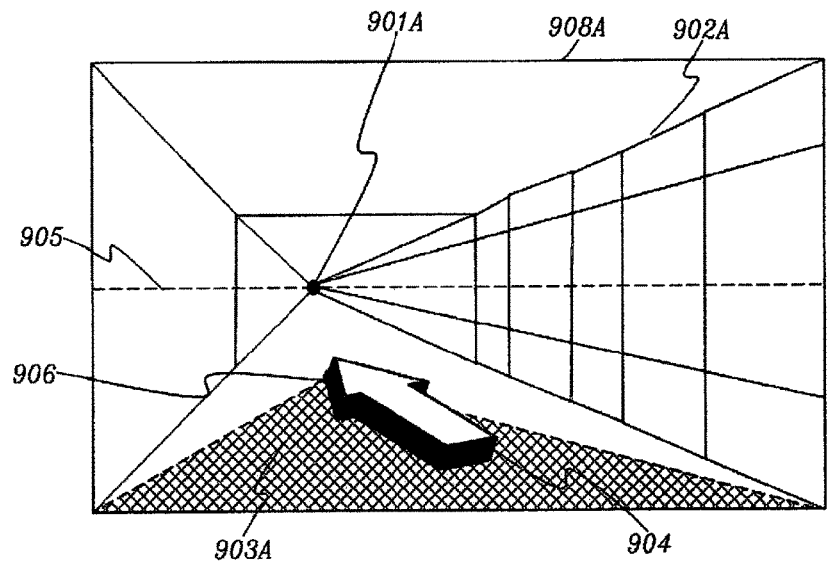
FIG. 9A-9C shows schematically additional motions of the cursor of FIGS. 8A-8C.
Figure 9B:
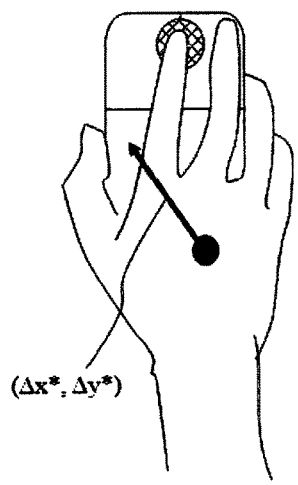
Figure 9C:
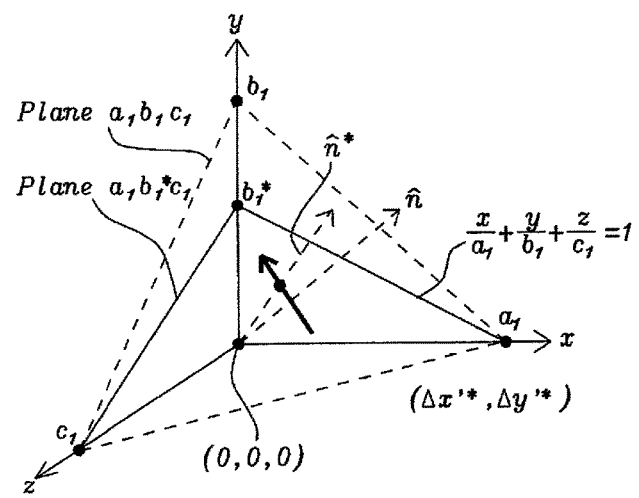
Figure 10A:
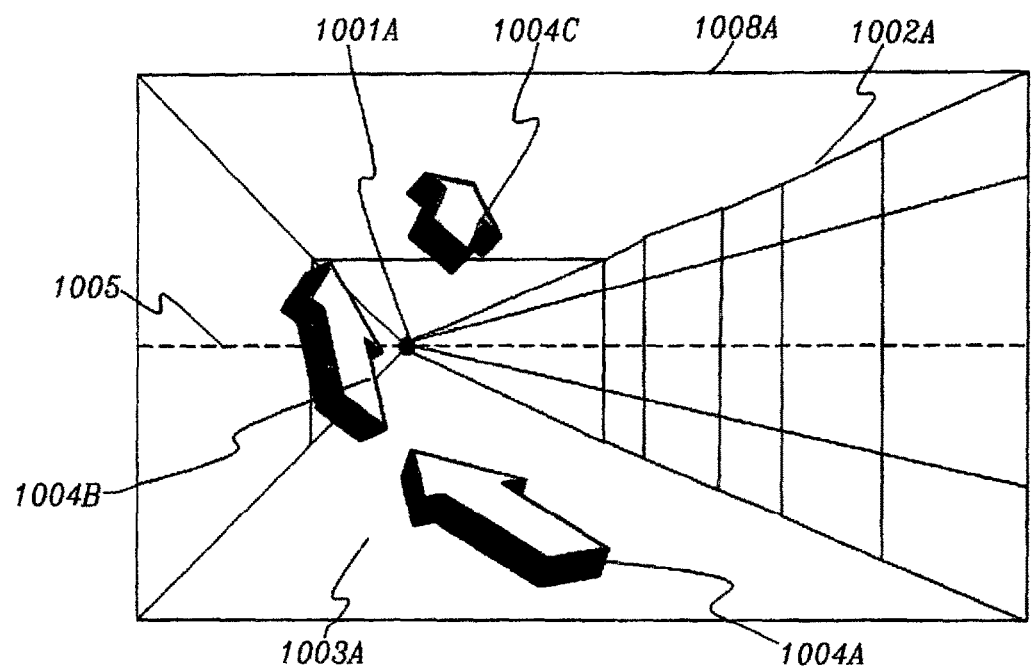
FIGS. 10A and 10B schematically shows how the present device can foster collaborative actions between an operator's fingers, wrist and hand movements to manipulate a moving cursor.
Figure 10B:
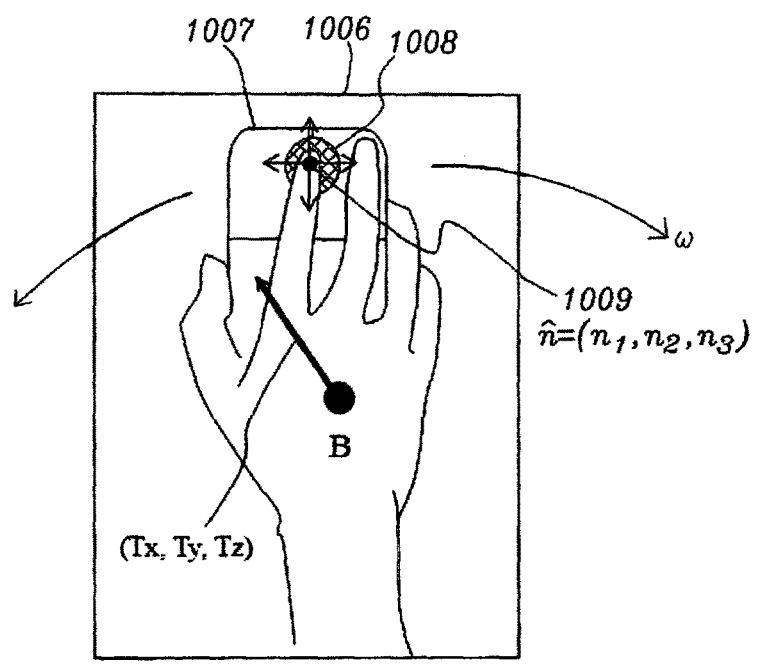
Figure 11:
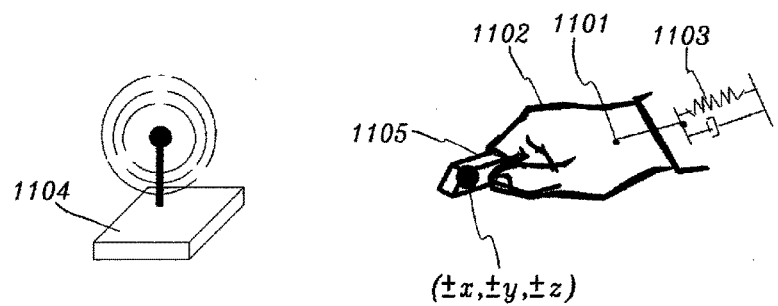
FIG. 11 schematically shows an EM tracker used in the prior art to track an operator's hand motions.
Figure 12:
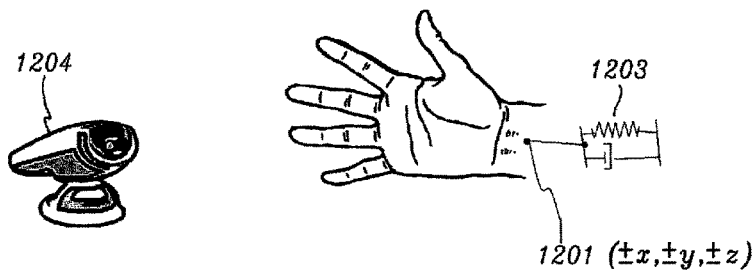
FIG. 12 schematically shows how a camera is used to track an operator's hand motions.
Figures 13A, 13B:
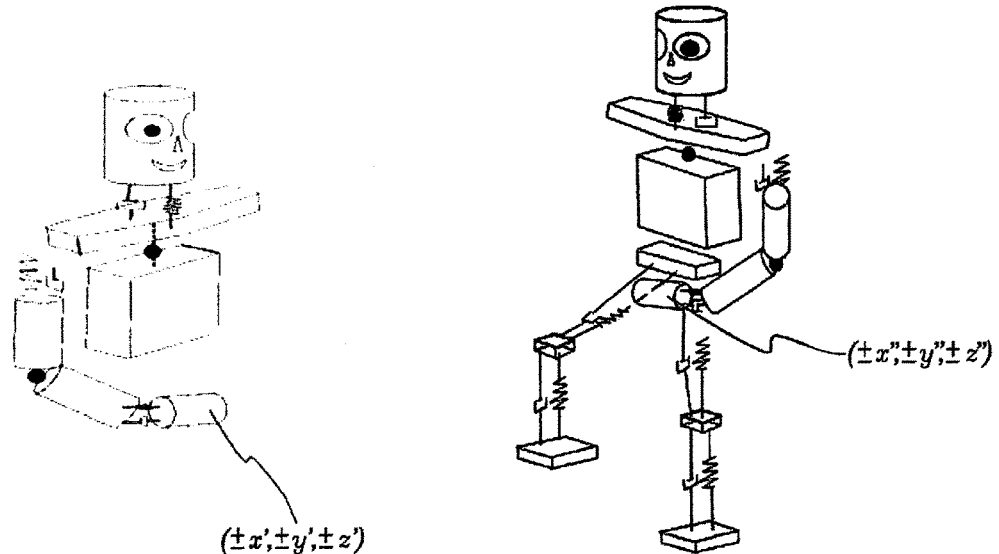
FIG. 13A-13B schematically depicts a mechanical model of vibration of a seated human (A) and a standing human (B).

The presently disclosed navigating device, in this exemplary form, comprises a set of light sources that are typically embedded within a cavity that opens onto the surface (see FIG. 5). These sources emit a plurality of light beams in different colors (i.e. wavelengths) such as red, green, and blue. There are other ways of placing said light sources (e.g., embedding said light sources in the bulk material of reference plane, like using a planar light guide within which light waves are propagating via many reflections/refractions). An optoelectronic sensor, (e.g. a CMOS image sensor, CCD, etc.) also embedded in the device is sensitive to reflections (or emissions) from the surface produced by these light beams (e.g. RGB, CYMK, etc.). When the navigating device moves on the reference surface ((1513) in FIG. 15C), as a result of the variations in light reflectance (or other forms of electromagnetic emission as previously noted) from the reference plane, the photon flux impinging on the optoelectronic sensor will be a mixed flux including contributions by various amounts (i.e. intensity) of photons in accordance with a ratio established by the reflectance values of the spots being illuminated (i.e. in red, blue, or green colors). When the device moves on the mouse pad (1513), the optoelectronic sensor detects that the color index data representing each respective point has been changed (e.g. CIE 1931 RGB). As the navigator maneuvers all over the mouse pad, a unique color gamut is formed based on the color index data defined by the coloration (distribution of dyes) of the mouse pad (1513). The unique color gamut defined by the "tinted" reference surface can be of arbitrary shape or dimension, e.g. in FIG. 15A, it is shown schematically in rectangular shape (1516). In practice, the size of this rectangular region (1516) can be smaller than that of the full color gamut (1502). Nevertheless, as a consequence of the substantially high sensitivity of modern optoelectronic sensors, the size of the mouse pad (i.e., the area over which the color gamut is formed) will not cause any restrictions on the performance of the navigator. Theoretically, even on a small mouse pad of dimension one inch by one inch, the gamut can provide millions of unique colors that will be resolved by the sensor. The abundant amount of color index data provided by the tinted mouse pad can satisfy the need for maneuvering a cursor on a large displaying device (e.g. a displaying panel 60 inch in diagonal).

When maneuvering a 3D object by both translational and rotational movement, measuring a color index from a tinted plane for motion detection is a more robust way of tracking motion than doing pattern recognition on a desktop surface. This can be explained by reference to Eq. (1). As Eq. (1) shows, when a navigator is intended to provide the position of P' for the computer, it has to know the whereabouts of point P on the reference plane, i.e., $$\begin{bmatrix} X \\ Y \\ Z \end{bmatrix}.$$

Otherwise, the rotational matrix will always be multiplied by zero and the P' data will be reduced to a translation.

There is another requirement for the data $$\begin{bmatrix} X \\ Y \\ Z \end{bmatrix}$$

of Eq. (1), it must have high positional accuracy. This is because the range of X, Y, Z is usually far larger than that of translational displacement data $$\begin{bmatrix} T_x \\ T_y \\ T_z \end{bmatrix}.$$

On a mouse pad that is 10 in. square, the point resolvable by a typical optical mouse at 500 dpi resolution is 5000×5000. Thus, the address of X, Y, and Z per pixel count falls in the range of about 0~5000. The binary data representing the numerical data 5000 takes as many as 13 bits. So, miscalculating X, Y, Z may easily introduce significant errors to the Eq. (1). In the present system, it is the color, or hue, of the reflected light (i.e. optical flow in different colors) that provides the data needed for motion detection. This is a method that is far more accurate than the block matching algorithm. As a consequence of the capability of calculating the translational and rotational motion vector resulting from a single gestural movement, maneuvering a cursor on a 3D graphic displaying device (1607) becomes relatively fast, closer to realism, and producing a positional resolution higher than that of the prior art. The following describes the calculation method used by the present system.

When the navigation device ((1512) of FIG. 15C) moves from point C to D on a tinted mouse pad (1513) under a constant illumination condition, the hue of the reflected light as seen by the cursor maneuvering device (1512) changes from point A to B in the color gamut (1502) regardless of the morphological condition of the mouse pad (1513). Since surface morphology (e.g. rough, smooth, glossy, etc.) does not affect the hue data drastically, each of the geographical positions on the mouse pad (1513) can be represented by a unique color index (e.g. CIE 1931 RGB, xyz, YUV, etc.). Specifically, every point in the color gamut (1502) can be represented by three independent parameters (e.g. R, G, and B of the color index (e.g. CIE 1931)). These three parameters gain their independence from one another in that each optoelectronic receptor (i.e. pixel) is sensitive to only one of those colors (e.g. red pixel, blue pixel, and green pixel). Knowing this characteristic, the device engineer can tint the mouse pad (1513) with red, blue, and green dyes/pigments, to create a specific gradient along each of the pre-defined directions (e.g. x-axis direction, y-axis direction, and z-axis direction) on the mouse pad (1513). The three independent parameters (e.g. R, G, B) on the 2D surface, can then be utilized as the reference data to designate the geographical points in a 3D graphic displaying device (1507).

Take FIGS. 15A and 15B as examples. FIG. 15B is a 3D coordinate system (1510) presented by a displaying device (1507), in which the origin point is located at point P'; the three orthogonal axes (x-axis, y-axis, and z-axis) are located at $\overrightarrow{P'Q'}$, $\overrightarrow{P'R'}$, and $\overrightarrow{P'S'}$, respectively. FIG. 15A shows the color gamut corresponding to the three dimensional coordinate system (1510), in which point P will be mapped to point P', lines $\overrightarrow{PQ''}$, $\overrightarrow{PR''}$, and $\overrightarrow{PS''}$ will be mapped to lines $\overrightarrow{P'Q'}$, $\overrightarrow{P'R'}$, and $\overrightarrow{P'S'}$ in the 3D coordinate system (1510), respectively. When the disclosed navigator (1512) moves from point C to D (e.g. under constant illumination condition), the color index of the reflected light as is detected by the navigator (1512) moves from point A (1508) to point B (1509) in the color gamut (1516). After data conversion and transmission, a series of motion vectors (1515) or positional data arrive at the computer or electronic system (1514), the cursor on the three dimensional displaying device (1507) moves from point A' (1511) to B' (1517) accordingly.

Figure 15F:
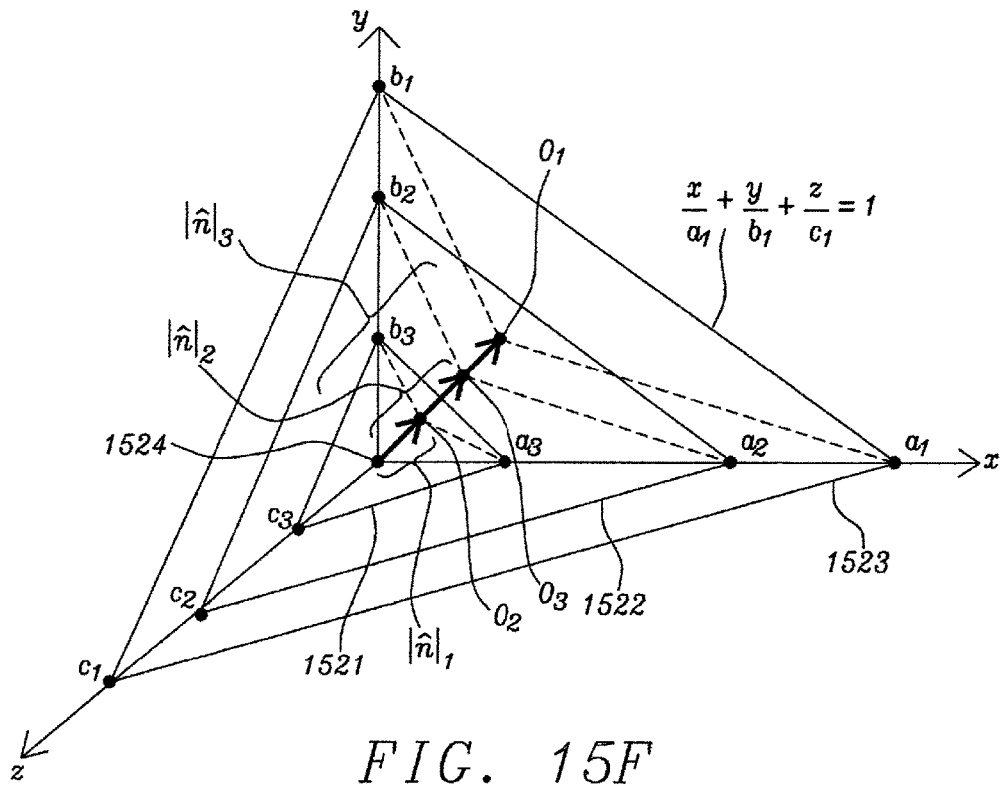
Figure 16A:
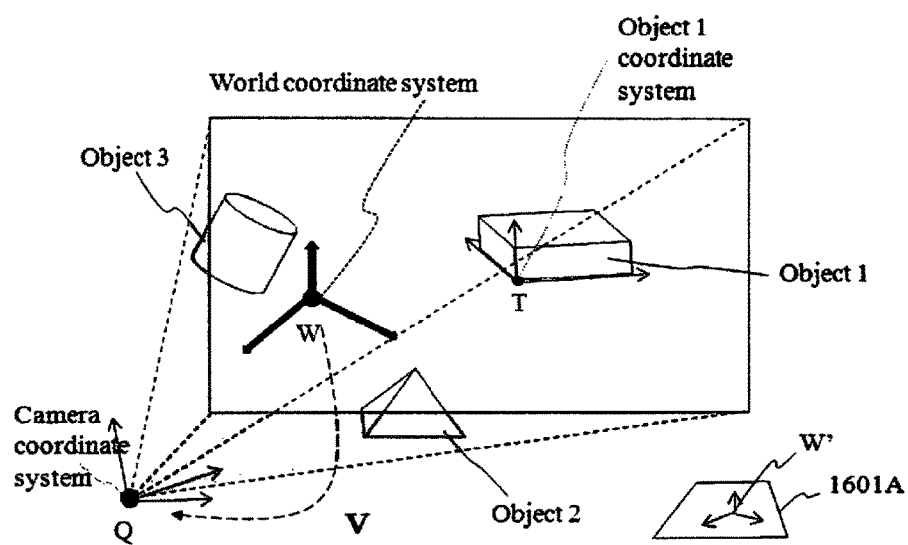
FIG. 16A schematically depicts objects in a scene drawn using the perspective feature of the present system and showing lines that are extrapolated to a single vanishing point.
Figure 16C:
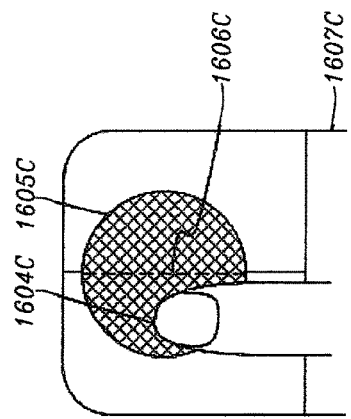
FIG. 16B-16E schematically depicts further applications of perspective drawing using a vanishing point.
Figure 16E:
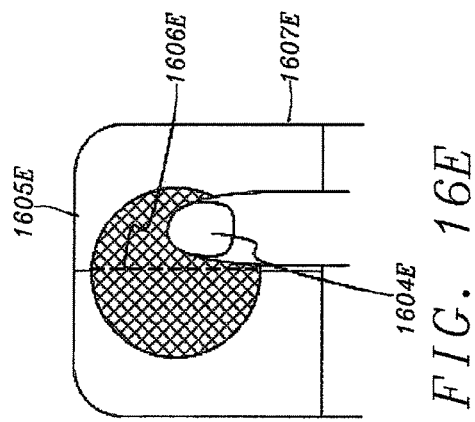
Figure 16B:
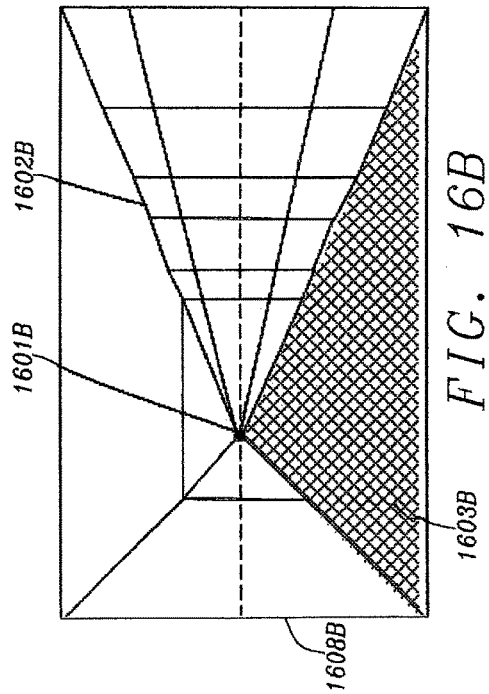
Figure 16D:
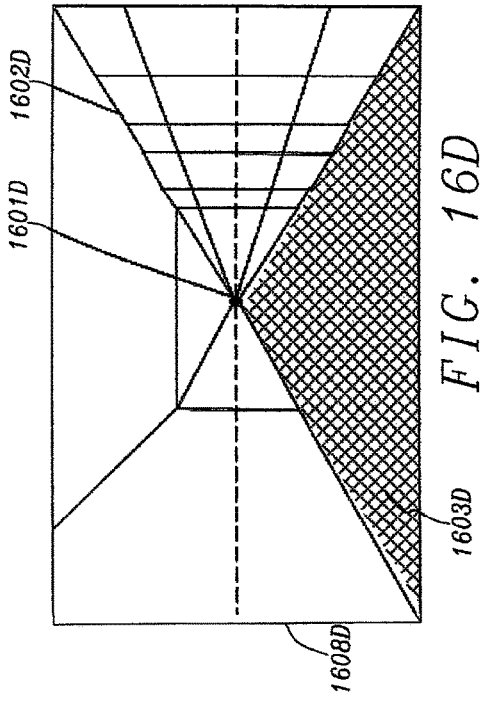
Figure 17:
FIG. 17 schematically shows an artist's hand sketch of a model (a 3D object) in which a 2.5D coordinate system must be inferred by the artist.
Figure 18:
FIG. 18 schematically shows a hand sketch of a model in motion, showing how the artist's use of subtle nuances gives the impression of motion.
Figure 19:
FIG. 19 schematically shows a 3D model whose shape is provided by mathematically calculated functions rather than an artist's hand gestures.

It is to be noted that both point A' and B' are located on the same plane Q'R'S'. So, what the plane Q"R"S" represents is not really a 3D volume; it represents a plane in 3D space. FIG. 15F schematically denotes the above situation more clearly. The reference planes (1519) and (1520) denote two planes in a 3D coordinate system. Mathematically, a plane (we call it Plane 7 hereafter) in a 3D coordinate system can be expressed as the locus of a set of coordinates x, y, z, that satisfy:

$$\frac{x}{A} + \frac{y}{B} + \frac{z}{C} = 1 \tag{15}$$

Putting unit vector ($n_1$, $n_2$, $n_3$) into Eq. (15), the new equation can be expressed as $$\left(\frac{x}{n_1} + \frac{y}{n_2} + \frac{z}{n_3}\right) \cdot \sqrt{A^2 + B^2 + C^2} = 1 \tag{16}$$

Where the values of $n_1$, $n_2$, $n_3$ are determined by the following equations.

$$n_1 = \frac{A}{\sqrt{A^2 + B^2 + C^2}} = \frac{A}{N} \tag{17}$$

$$n_2 = \frac{B}{\sqrt{A^2 + B^2 + C^2}} = \frac{B}{N} \tag{18}$$

$$n_3 = \frac{C}{\sqrt{A^2 + B^2 + C^2}} = \frac{C}{N} \tag{19}$$

Where $n_1$, $n_2$, and $n_3$ are the parameters of the unit vector normal to plane 7, and the parameter N (which equals $\sqrt{A^2+B^2+C^2}$) can be deemed as a "zooming" factor (i.e. scaling factor).

Figure 14A:
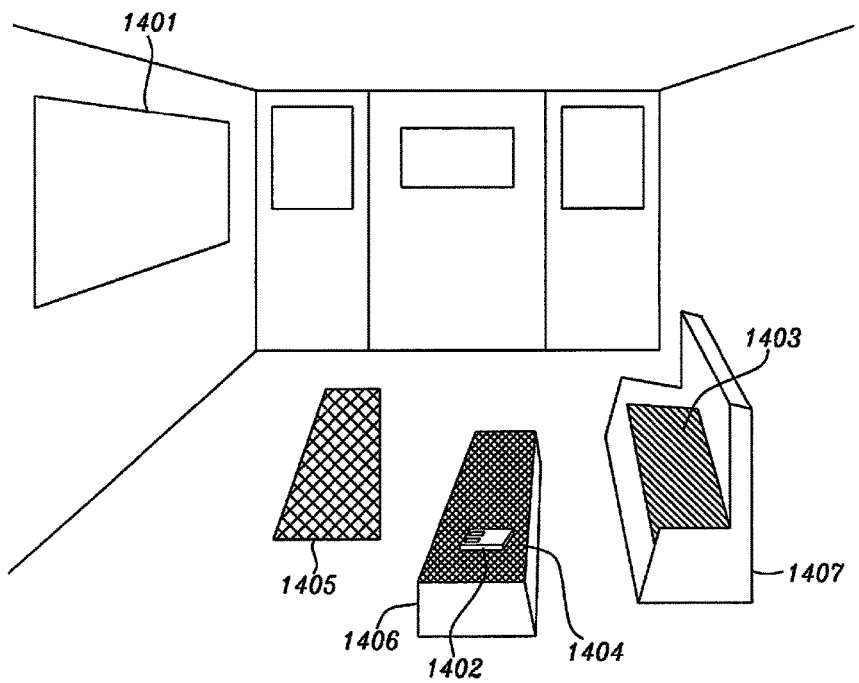
FIG. 14A schematically depicts a "playroom" of the future in which different surfaces will be used to guide the motions of a navigational device.
Figure 14B:
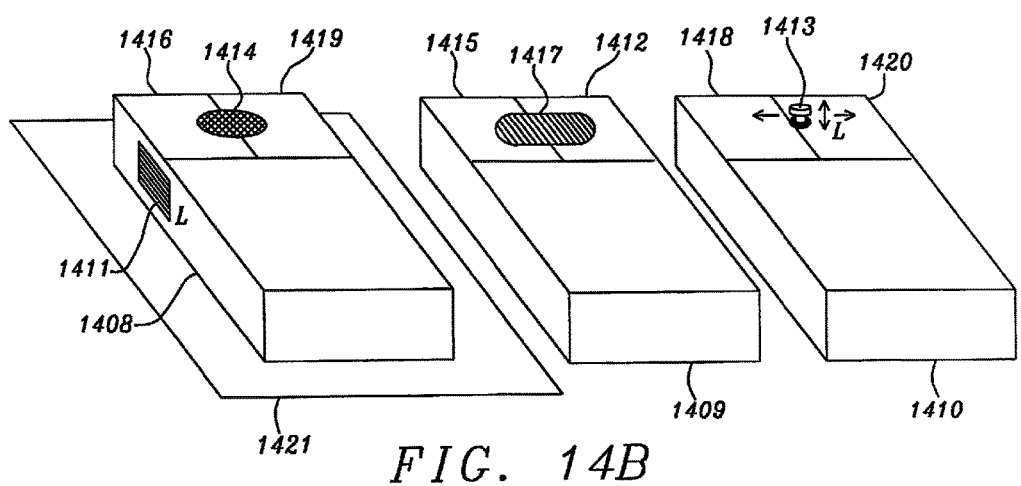
FIG. 14B schematically shows three designs of the present navigational device that include a zoom in/out feature.
Figure 14C:
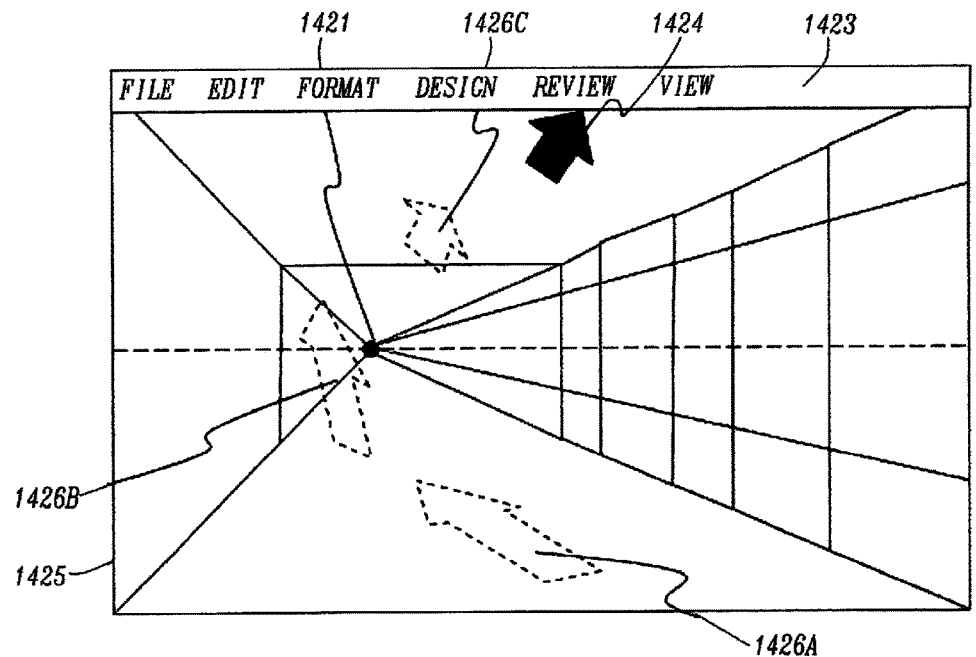
FIG. 14C-14D schematically show the effects of a cursor that can both move 3-dimensionally and still exhibit the features of a 2D device.

When the value N ($\sqrt{A^2+B^2+C^2}$) is very large, it denotes a situation that the object (i.e. the plane where the object is positioned) is relatively close to the computer operator (we only take the first quadrant into consideration), and vice versa. FIG. 15F shows several planes having the same unit vectors but different scaling factor N (1521, 1522, and 1523). When the navigator moves over the tinted reference plane, in cooperation with the scaling factor N, it can reach any point in the designated 3D coordinate system. FIG. 14B schematically shows a few exemplary designs (1408, 1409, 1410, etc.) of the presently invented navigator associated with the input apparatus to increase/decrease the scaling factor N (i.e., (1411) is a press button, (1412) is also a press button, (1417) is a touch-sensitive feature, (1413) is a wiggling knob . . . ). As FIG. 14B shows, the scaling factor can be adjusted by the press button L (1411) or using (1413), a wiggling/press button. Press button L (1411) is a zoom in/out device; it combines two functions in one. When in default condition, the press button L (1411) is disabled. To enable its functionality, press button L must be pressed down for a period of time. After then, depending on the position of said press button L (or the force applied by operator's finger, etc.), the scaling factor N can be increased or decreased accordingly. Note that the act of pressing button L does not hinder the calculation process of the navigator. Thus, while the navigator (1408) is maneuvering over the reference plane (1421), the operator can adjust the scaling factor simultaneously. It is now understandable that the navigator (1408) can reach any point in a 3D coordinate system.

Figure 14D:
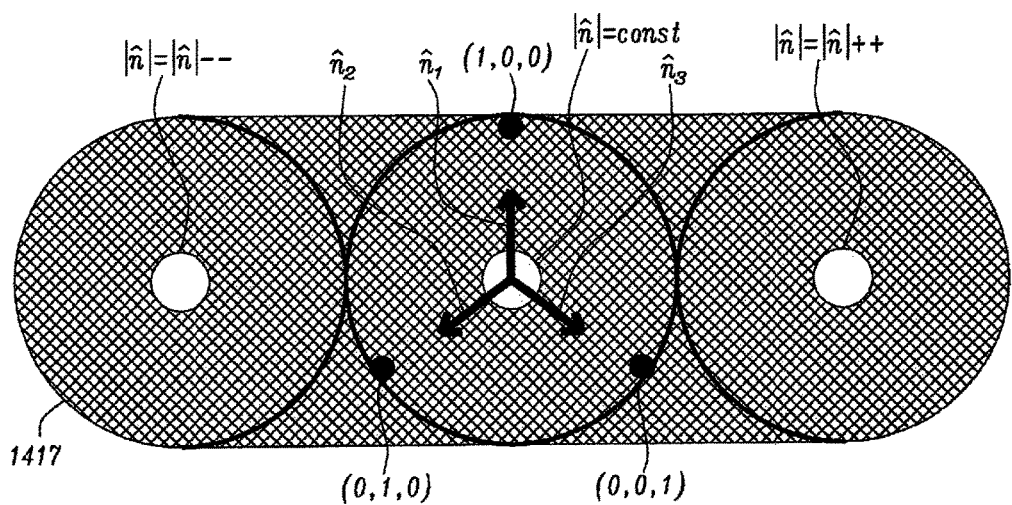

The press button (1411) can have many varieties in its generic design. For example, the design of (1417) literally is an integrated design of the touch sensing feature (1414) and zooming in/out button L (1411). The design of wiggling/ retracting knob (1413) has similar purpose as that of (1417), except said wiggling/retracting knob (1413) detects the wiggling movement of the operator's finger by sensing its tilting angles (i.e., the "wiggling" angle of said knob). There are other features that may go along with said zooming/ wiggling features (e.g., 1411, 1417, and 1413). For example, features (1412), (1415), (1418), (1419), and (1420) may denote the conventional mouse buttons; they can collaborate with the said zooming in/out feature (e.g., 1411, 1417, or 1413) to denote certain functionalities. Referring back to FIG. 15F, the plane (1521), (1522), and (1523) are three planes having the same unit vector but different scaling factors ($|\hat{n}|_1$, $|\hat{n}|_2$, and $|\hat{n}|_3$). This can be implemented by the touch sensing feature (1417). So, FIG. 15F can be compared to FIG. 14D for better understanding. As FIG. 14D shows, the entire surface of said touch sensing feature can be designated to three zones, i.e., $|\hat{n}|$=const, denoting there is no zooming in/out; $|\hat{n}|=|\hat{n}|--$, denoting the scaling factor $|\hat{n}|$ is decreasing; $|\hat{n}|=|\hat{n}|++$, which denotes the scaling factor $|\hat{n}|$ is increasing. The operator must be noticed that point (1524) denotes the point lying in a distance of infinity to the viewer; point (1524), namely, is the vanishing point to the graphic artists, as has been described in the background section. In FIG. 15F, the relative angle (e.g., $\angle a_1 O_1 b_1$, $\angle a_2 O_2 b_2$, etc.) formed by vanishing point of each plane (e.g., 1523, 1522, and 1521, etc.) and the corresponding terminals (i.e., $a_1$, $b_1$, and $a_2$, $b_2$) will not be changed when the presently disclosed navigator maneuvers on the reference plane (1521), (1522), or (1523). This unique feature (perspective sketching) provides an extraordinary convenience for the people in electronic graphic art profession. That is, the graphic artists can zoom in and out the scene to perform his/her professional work on different layers (e.g., 1521, 1522, 1523) without worrying changing the perspective angle inadvertently. The vanishing points $O_1$, $O_2$, and $O_3$ will always reside on the same geographic point of reference plane (1521), (1522), (1523), etc. So, the graphic artist can align his/her hand movement on the reference plane to the scene he sees in the displaying device, much like how a sketching artist normally do in the studio (i.e., the above stated alignment is a plane-to-plane one).

There are many occasions where a graphic artist would want to draw a curve, produce a genre by strokes, or use finesse to improve the work. This has to do with the non-linear motion of the artist's hand, where linear motion implies a hand motion only generates translational motions).

$$\frac{T_x}{n_1} + \frac{T_y}{n_2} + \frac{T_z}{n_3} = 1 \tag{20}$$

It must be acknowledged that all the translational motion vectors identified by planes (1521), (1522) and (1523) of FIG. 15F satisfy Eq. 20 (their unit vectors are the same). To reach a point (or a pixel address) that may be located out of plane (1521), (1522) and (1523) etc., the disclosed navigator have to resort to the rotational matrix R of Eq. (1). The associated methods have been explained in the previous section. Thus, by a rotational movement which may take place concurrently with the translational movement, the address of point P' as is calculated by Eq. (1), and the new position P' may fall out of plane (1521), (1522) and (1523). Compared to the motion vector derived by Eq. (20), one may conclude that the scenery controlled by Eq. (1) is a 3D object, whereas that of Eq. (20) is 2.5 D. Naturally, the 3D one gives people a feeling that the object is live, but the vanishing point is no longer being positioned on a fixed point of the reference plane (to certain operators, this kind of scene may be exceedingly dynamic). What is a big blessing is that the operator can switch between said two modes (2.5D or 3D mode) relatively easily; and because of the hue detecting capability of the presently disclosed navigator, the positional accuracy in either mode is maintained at unprecedented high resolution and sensitivity.

At this stage, the presently disclosed navigator (1512) is a point-to-point system; for every geographical point on the tinted reference surface (1513), there lies one and only one point on the 3D displaying device whose address corresponds to the whereabouts of such geographical point. On the other hand, the present invention reserves the capability for relative motion detection. When working in relative motion detection mode, the data stream sent by said cursor maneuvering device (1612) can be formed in delta format (i.e. ($\Delta x_1$, $\Delta y_1$, $\Delta z_1$) and ($\Delta x_2$, $\Delta y_2$, $\Delta z_2$)). In practice, the operator may choose either mode that he/she desires. When the presently disclosed navigator (1512) works in the relative motion sensing mode, it will continually measure the difference of the intensities of the red, green, and blue light along with the relative movement between said three dimensional cursor maneuvering device (1512) and mouse pad (1513). After the conversion by Eq. (6), the data sent to the remote computer is a positional displacement data (i.e. ($\Delta x$, $\Delta y$, $\Delta z$)) for cursor maneuvering use.

The presently disclosed navigator may collaborate with the conventional art to generate some unique functionality. For example, when both methods are used (i.e. pattern recognition and color detection), there will be two independent motion vectors generated by a single gestural movement of the operator's hand instead of just one. The first motion vector is acquired by the "tinting" condition of the mouse pad, which is a property of the present disclosure. The second motion vector has to do with pattern recognition, which is taught in U.S. Pat. No. 9,733,727. When used for deriving the rotational motion vector, the data acquired by the first method (acquired by tint detection) and the second method (acquired by pattern recognition) can be compared to yield a rotational motion vector $\omega$. Thus, just by a single gestural movement of the presently disclosed cursor maneuvering device (1512), a 3D motion vector ($\Delta x$, $\Delta y$, $\Delta z$) plus a rotational motion vector ($\omega$) can be derived simultaneously. The new set of motion vectors derived by the single gestural movement of the operator's hand becomes a four parameter one vector: ($\Delta x$, $\Delta y$, $\Delta z$, $\omega$). This result profoundly empowers the next generation three dimensional display industry.

The present disclosure offers a unique flexibility of working in different environments. When placed on a desktop surface without the tinted mouse pad (1513), the presently disclosed cursor maneuvering device (1512) works as a 2D optical mouse. When placed on the 3D tinted mouse pad (1513), the presently disclosed cursor maneuvering device (1512) works as a three dimensional cursor maneuvering device. In either case, the presently disclosed cursor maneuvering device (1512) allows the operator to obtain six degrees of cursor movement while only physically moving his or her hand on a 2D plane (e.g. the desktop surface or mouse pad); the six degrees of cursor movement (i.e. X, −X, Y, −Y, Z, and −Z) is in fact the result of the generic property of light (i.e. what we learn from the physics of electromagnetic radiation). There is no need to roll a ball or wiggle a joystick as the conventional arts have to do. The presently disclosed device offers an unprecedented advantage for the next generation cursor maneuvering device. It is a high resolution and high sensitivity three dimensional cursor maneuvering device in the shape of a conventional optical mouse, and it is able to control the movement of objects or cursors in a three dimensional displaying device (e.g. 3D flat panel display) without physically departing from the 2D desktop surface.

It is also important to illustrate the capability of the presently disclosed device in terms of microelectronic circuitry design. FIGS. 15A, B, and C schematically illustrate a way of implementing the presently disclosed navigator (1512) without using a sophisticated DSP (digital signal processor), equivalent to the microprocessor in the IC industry. The 3D motion detection circuitry in the cursor maneuvering device is designed to measure the tint of mouse pad (1513), it only needs to sense the variations in hue (i.e. no pattern recognition is required). This makes the disclosed device simple, highly sensitive, with high resolution, high speed, economic in power consumption, and ergonomic. In an extreme case, the DSP may be totally removed, but this is not a prerequisite of the present invention.

Embodiment 1

Embodiment 1 teaches a method of forming a planar reference surface (e.g. mouse pad (1513) of FIG. 15C) which can be used by the present system to create a 2.5D cursor maneuvering device (1512). Embodiment 2 will extend the performance capabilities of the device to that of a 3D one.

Figure 20A:
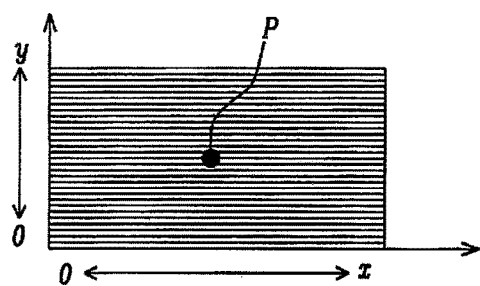
FIG. 20A-20F schematically show a tinted planar reference surface which is able to provide three non-interfering profiles that will produce absolute 3D positional data for the computer to use.
Figure 20B:
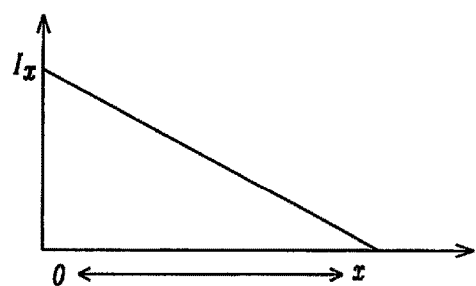
Figure 20C:
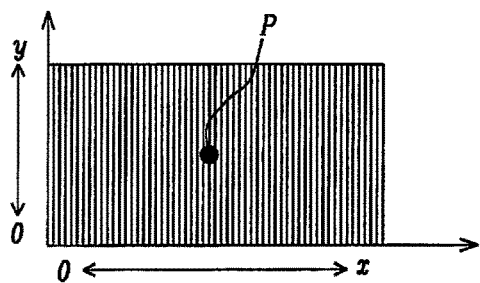
Figure 20D:
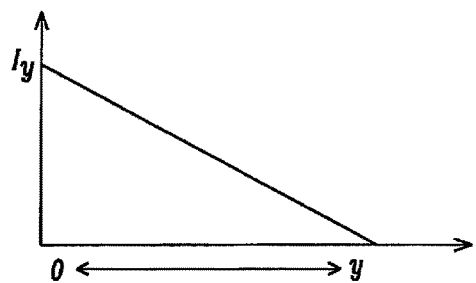
Figure 20E:
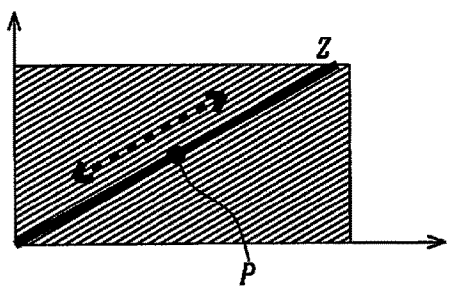
Figure 20F:
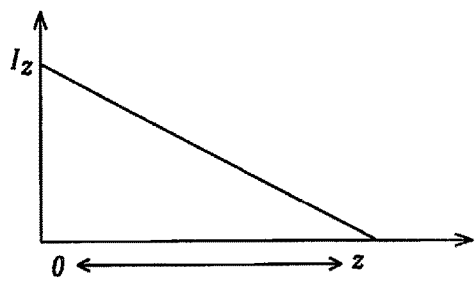

As FIGS. 20A, 20C, and 20E shows, a tinted reference plane (1513) can be fabricated by screen-printing means, or whatever means of similar effect. In FIGS. 20A, 20C, and 20E, each figure has a specific profile (light intensity in the respective wavelength regime) along one axis (e.g., x, y, or z axis or another axis specified by the system). Thus, the apparent color of each of the respective points on the surface is a combination of, for example, red, blue, and green (In FIGS. 20B, D, and F, they are represented generally by the color index intensities $I_x$, $I_y$, and $I_z$). For example, as FIG. 20A shows, along the horizontal axis, from 0 to x, the color index $I_x$ has been chosen to be a linearly decreasing one; this phenomenon is depicted by FIG. 20B. Using the same method, one may designate the profiles for the other color index, i.e., $I_y$, along the vertical axis (i.e., y axis). The third color index $I_z$, the one that denotes the z axis, varies its respective value along the diagonal direction (e.g., 45° to the x axis).

We take point P for analysis; we arbitrarily pick a point at about the geometrical center of the reference plane (1513); point P hence produces a mixed colored light (a mixture of radiation wavelengths) comprising about half of the maximum of $I_x$, half of the maximum of $I_y$, and half of the maximum of $I_z$. For all points that reside on the right of point P, the respective color index value $I_x'$ is higher than of the maximum of $I_x$, and vice versa. Similar rules (of coloration) may apply to the other two color indexes, i.e., $I_y$ and $I_z$. Thus, namely every point on a reference plane conjunctly formed by FIGS. 20A, C, and E has a unique combination of the color index ($I_x$, $I_y$, $I_z$). These color indexes ($I_x$, $I_y$, $I_z$) are in fact the parameters (A, B, C) referred to in Eq. (6). Through Eq. (6) one is able to derive the geographical address data (X, Y, Z). We then use such geographical data (X, Y, Z) to gain access to the respective points in 3D coordinate system. Thus, we have mapped a 2D plane into a 2.5D space.

We must point out that the coordinate system formed by FIGS. 20A, C, and E is a 2.5D instead of a fully 3D one since the angle formed by the x axis and z axis is a fixed one (e.g., 45°). To make said coordinate system a genuine 3D one, such an angle must be adjustable, and this shall be elaborated in embodiment 2.

The point P has a special usage, it can serve as the vanishing point in a perspective sketching graphic rendering system.

Figure 21A:
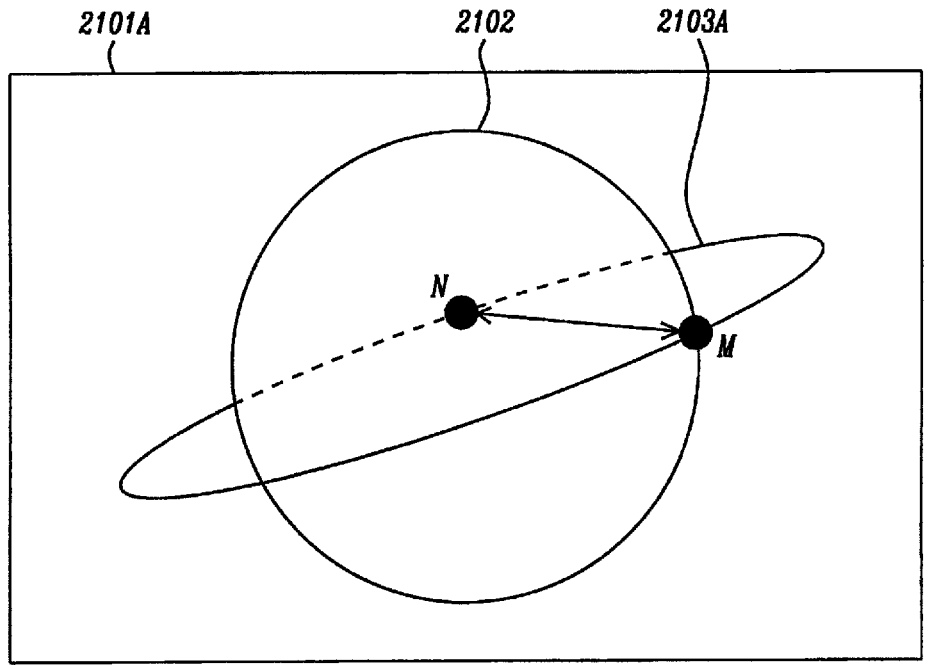
FIGS. 21A and 21B schematically illustrates how a 2.5D graphical rendering device uses a 2.5D reference plane when using the present device.
Figure 21B:
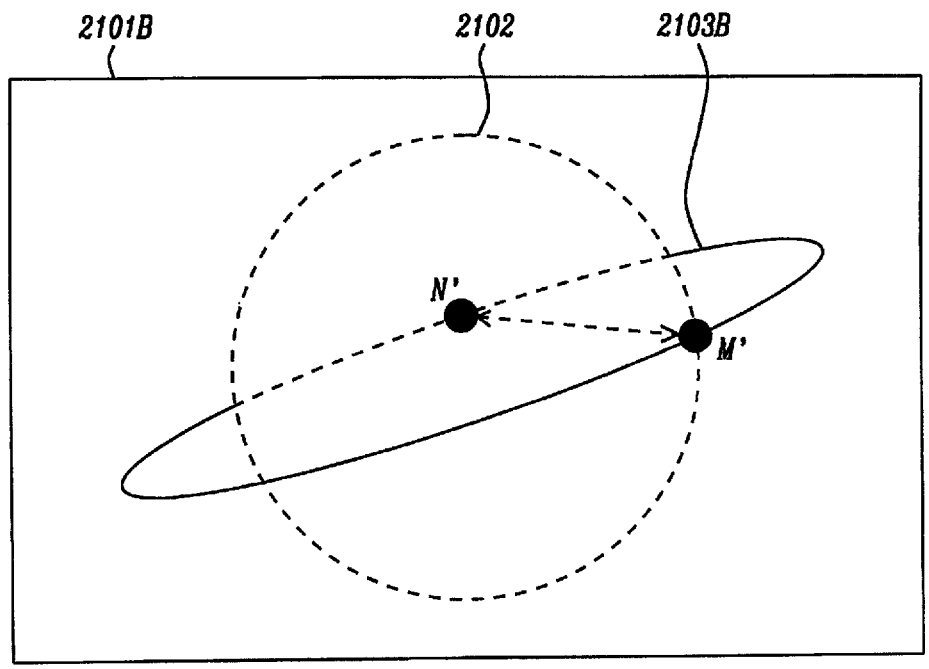

A 2.5D cursor maneuvering system (i.e., cursor maneuvering device (1512) plus a 2.5D reference plane) can collaborate with the 2.5D displaying device seamlessly. We refer now to schematic FIGS. 21 A and B. A globe (2102A) is presented by a 2.5D displaying device (2101A); through collaboration between the presently disclosed 2.5D cursor maneuvering system ((1512) and the 2.5D reference plane (2101B)), the operator is able to access to all points on the globe that he/she can see from a specific perspective angle (e.g., 45°). Those points that cannot be seen by the operators at one time (e.g., points on the back of the globe, such as point N) would require an adjustment of z value whenever the operator desires to access to them.

In embodiment 1, the range of depth value z denotes the depth of scene. Thus, by moving the cursor maneuvering device (1512, not shown in FIG. 21B) from point M' to N' on the reference plane (2101B), the depth value z as is detected by the presently disclosed navigator changes accordingly. The cursor on the displaying device (2101A) henceforth can be moved from M to N (N is invisible to the operator at this moment). As has been explained in former paragraphs, the 3D geographic mapping relationship between the displaying device (2101A) and reference plane (2101B) facilitates the operator to build up his/her finesse in 3D applications, which is extremely important to the careers that require the dexterity.

If the depth value provided by said 2.5D cursor maneuvering system is not sufficient to cover that of the 2.5D displaying device (2101A), one may resort to Eqs. (2) and (6) to numerically expand the depth value. That is, based on same set of color index (A, B, C), elements $F_{A=1,\ B=0,\ C=0}$, $F_{A=0,\ B=1,\ C=0}$, or $F_{A=0,\ B=0,\ C=1}$ shall be increased to yield larger Z values (this can be done automatically since Eq. (6) and the respective elements are stored in presently invented cursor maneuvering device 1512).

Embodiment 2

Embodiment 2 is an extension of embodiment 1, from a 2.5D cursor maneuvering system to a genuine 3D one.

As has also been defined in the background, the term 2.5D means that the technique used has the depth value, which the 2D one does not, but it cannot provide the full rotational function; the 3D one does.

It is now clear that human hand usually has linear and non-linear motions, conventional optical mouse has tossed away the non-linear portion of mouse movement. For a reference plane formed by a constant tinting mean (e.g., dying, pigmenting, etc.), the motion data acquired by hue is a 2.5D type (i.e., there are x, y, and z data, but the perspective angle is fixed). Note that from the said tinted reference plane, a second motion data can be acquired by the pattern recognition feature embedded in the presently disclosed cursor maneuvering device. This pattern recognition feature is nothing different than those of the conventional optical mouse. Contrary to said first set of motion data (acquired by hue detection); said second set of data has more to do with the surface morphology (e.g., dust particles that can be targeted by said pattern recognition feature), and its result shall not be affected by hue variations by and largely. For example, if one of the three light sources (e.g., 503, 505, or 507 of FIG. 5) of the presently disclosed cursor maneuvering device slightly changes its illumination condition, then the motion vector data measured by said pattern recognition feature will not be affected much, but the one associated with tint measurement feature will. In essence, when the presently disclosed cursor maneuvering device moves on the reference plane (1608B), the tint value measuring feature provides a first data set ($X_i$, $Y_i$, $Z_i$), the pattern recognition feature provides a second of data set, ($X_{ii}$, $Y_{ii}$, $Z_{ii}$), respectively. In practice, the second feature may use Eq. (5A) and (5B) to convert a set of (x, y) data into (x, y, z), the difference between the two motion data can be expressed as the following (Eq. (21)).

$$(\Delta X, \Delta Y, \Delta Z) = (X_i, Y_i, Z_i) - (X_{ii}, Y_{ii}, Z_{ii}) \qquad (21)$$

Thus, Eq. (21) provides a 3D motion vector (i.e., $\Delta X$, $\Delta Y$, $\Delta Z$) in an unprecedented way; it denotes the non-linear portion of the movement of the presently disclosed cursor maneuvering device. ($\Delta X$, $\Delta Y$, $\Delta Z$) can be used together with the translational motion vector to control certain non-linear movement of the object in the displaying device. Endowed with such a unique feature, a 2.5D displaying device now can be characterized as a 3D one.

For example, if an operator desires to set the magnitude of a rotational motion vector significantly larger than the presently disclosed cursor maneuvering devices originally has provided, one way to do it is to change the tinting condition of the reference plane by optical means (e.g., 510). This can be explained by FIG. 5. If judged from outlook, the presently disclosed cursor maneuvering device (i.e., embodiment 2) may look like a conventional optical mouse. However, the cursor maneuvering device (502) shown in FIG. 5 differs from the conventional art in that said cursor maneuvering device is affiliated with a color sensitive optoelectronic sensor (509) and three light sources (i.e., 503, 505, and 507), each of which emits a light ray in different colors (e.g., red, blue, and green; other color are also permissible); a similar device is shown in FIG. 15 (1512), which is a simplified model of (502), allowing multiple light rays to impinge on the reference plane (1513) from one or more lighting fixture (the origin of light source for reference (1513) may vary; they are not limited to the situation as designated by item 503, 505, or 507 of FIG. 5).

Note that in both FIGS. 15 and 5, the respective optoelectronic sensors (e.g., 509) are color sensitive ones. Thus, like FIG. 15A, said cursor maneuvering device can form a color gamut of its own (i.e., whose shape is presented by (1502). Note that the positions of point Q, R, and S may shift due to the variation of the respective light intensities. So we will use FIGS. 15A and C to illustrate what happens when one light source (e.g., 503, 505, or 507 in FIG. 5) changes its output power (or certain characteristic, such as polarity, shutter speed of said optoelectronic sensor, etc.). It is also to be noted that the output power of the three light sources (503, 505, and 507) are independently controlled by the driving circuitry of the cursor maneuvering device. Thus, when the intensity of one light source changes, the output power of the other two light sources can be maintained unchanged. Under this circumstance, the point of equal intensity (e.g., point P in FIG. 15A) will shift its position toward or away from the light source that changes its output power. Consequently, the origin point P' of the coordinate system in the 3D displaying device (1507) may change its position along one axis (e.g., $\overline{P'Q'}$, $\overline{P'R'}$, or $\overline{P'S'}$) corresponding to the output power adjustment of one lighting source (e.g., 503, 505, or 507). Thus, when the presently disclosed invention moves though the same geographical path on the reference plane (510), a new set of color indices (e.g., A', B', C') is acquired. This new set of color index in turn, through the conversion process provided by Eq. (6), provides a new set of motion/position data, i.e., ($X_i'$, $Y_i'$, $Z_i'$). FIG. 15D shows that a microscopic feature (e.g., 1518B) on the reference plane (1507D) will not change its morphology due to various light tinting conditions. If an operator moves the presently disclosed cursor maneuvering device on said tinted reference surface, the morphology/microstructure of said reference plane (510) will not be changed, henceforth the second set of motion vector/positional data (usually measured by BMA method, monochromatic images) is not much changed, it is still ($X_{ii}$, $Y_{ii}$, $Z_{ii}$). Putting the new first set of data and old second set of motion vector data into Eq. (21), one derives Eq. (22) which is the following:

$$(\Delta X', \Delta Y', \Delta Z') = (X_i', Y_i', Z_i') - (X_{ii}, Y_{ii}, Z_{ii}) \qquad (22)$$

One may find that the rotational motion vector has changed (i.e., from ($\Delta X$, $\Delta Y$, $\Delta Z$) to ($\Delta X'$, $\Delta Y'$, $\Delta Z'$)). This is equivalent to say that the rotational motion vector can be manipulated by adjusting the tinting (i.e., lighting) condition of the reference plane (510).

We will take an imagined Disney® Video Program as the example of using the above stated four parameter motion vector. We visualize a swordfight between Peter Pan and Captain Hook. As compared to a previous 2D system in which an operator cannot rotate Peter to face Captain Hook as he flits around Captain Hook, this time the rotational motion vector of Peter is changed by the computer program in a timely fashion (i.e., the output power of the respective light sources is timely adjusted in accordance with the status of computer program). When Peter Pan now flies around Captain Hook through a succession of three dimensional arcs, his body gestures keep changing. That is, when Peter Pan is on Captain Hook's right, his face will turn left to face Captain Hook. When Peter Pan flies to Captain Hook's left, his face will turn right. Through the help of Eq. (21) and different tinting condition on the reference plane (510), the operator is able to derive the desired motion vectors for Peter Pan. To reiterate, the relative weigh between translational motion and rotational motion (i.e., the non-linear portion) of an object's movement can be adjusted by the presently disclosed cursor maneuvering device.

Embodiment 3

In embodiment 3, the cursor maneuvering device has fundamentally changed its hardware structure from that of a desktop mouse to a 3D touch pad. From its appearance, the entire hardware of the device resembles that disclosed in U.S. Pat. No. 9,720,525. The major difference between the device of this embodiment and the teachings of U.S. Pat. No. 9,720,525 is that the present device converts the tri-stimuli color index data (e.g. CIE 1931 RGB) into a 3D coordinate one (X, Y, Z). The device provided by U.S. Pat. No. 9,720,525 technique, on the other hand, knows nothing about this optical physics—it only provides 2D data (X, Y).

Figure 22:
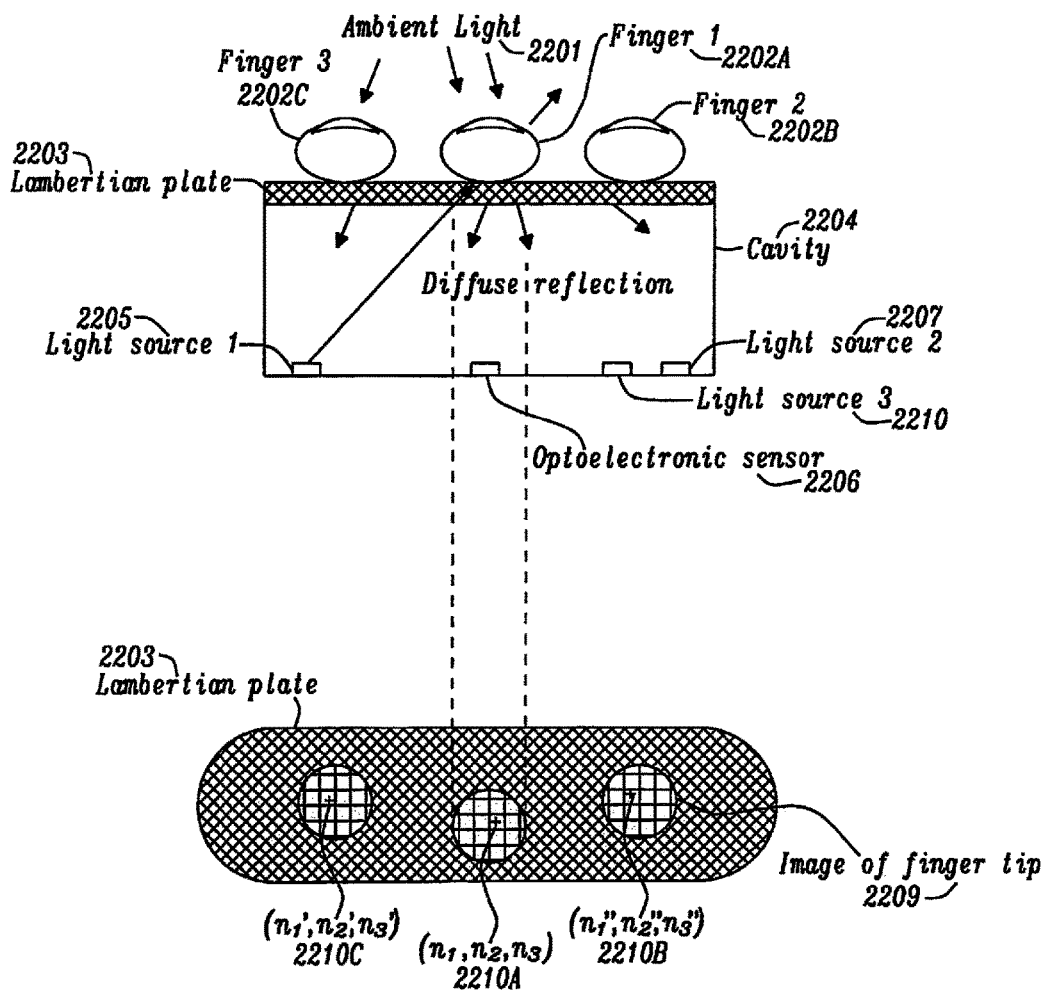
FIG. 22 schematically shows a 3D touch pad using multiple light sources as an alternative implementation of the present device.

Referring now to schematic FIG. 22, the navigational device of this embodiment is formed from a cavity (2204) which is covered with a light mixing plate (2203), e.g. a Lambertian plate, a light diffusing plate, or a fluorescent plate. The cavity (2204) contains a plurality of colored light sources (i.e. 2205, 2207, 2210), which are constructed of, for example, LEDs (light emitting diodes), where each light source emits light in a color (i.e. wavelength) different than that of the other. The cavity (2204) also contains a photo sensor (2206), and the cavity (2204) can be formed into different shapes, e.g. square, rectangular, circular, oval, etc. The plurality of light sources are positioned in a manner on the base of the cavity (2204) as separated as possible, and the photo sensor (2206) is positioned on the base of the cavity (2204) amongst the plurality of colored lights in such a way as to allow the image sensor to detect the image of the pointing device in contact with the surface of the light mixing plate.

The light mixing apparatus (e.g. a Lambertian plate, a diffusing plate, or a fluorescent plate, etc.) plate (2203) is a semi-transparent plate that has a surface, which is a nearly perfect diffusing surface. The light mixing plate is semi-transparent, which allows light from either side of the plate to pass through in a highly diffused state, but the observer is not able to discern the exact shape of any object that lies at a distance from the opposite side of the plate. The light mixing plate (2203) that covers the cavity (2204) disperses the ambient light falling on its surface, which is external to the cursor maneuvering device, and the light mixing plate (1403) does the same work for the light beam coming from within the cavity when it passes through the light mixing plate. As of such, a blurred image without clearly defined contours will be formed on the photo sensor (e.g. 2206). Mathematically, the light mixing effect can be modeled by radiative transfer equations (RTE). For example, a rough surface would scatter light in more directions (i.e. more isotropic) than a smooth surface does. Thus the clarity of the image caused by the light beam being reflected by the two different kinds of surfaces differs as a result of different scattering effects.

The image blurring phenomenon is enhanced when an object is moved to a distance farther away from the light mixing plate (2203), and the image blurring is reduced as the object is moved closer to the light mixing plate (2203). There are other methods and types of plates that may serve the same purpose of passing a mixed light to the image sensor. For example, a transparent plate with a pointing device being able to mix the incoming light and reflect it back to the image sensor will allow the image sensor to track the pointing device based on the color reflected back to the image sensor. In the conventional art, an object with the blurred edge poses a challenge for pattern recognition, and makes the task of motion detection nearly impossible. However, in the present disclosure, the task of motion detection is not rendered impossible since it is the color of the object, or pointing device, rather than the edges, or contours, of the object that determines the location. The light intensity value of the object, or pointing device, being tracked has the highest value when the object, or pointing device, is touching the mixing plate, the blurred image of the object, or pointing device, has a higher light intensity than that of the surrounding area of the mixing plate. This bright but blurred spot serves as an ideal target for the image sensor to trace when the object, or pointing device, is moving on the light mixing plate. The plurality of light sources within the cavity are preferably LED devices; however, other light sources can be used. The image sensor is preferably a color-sensitive CMOS imaging device capable of viewing the inside surface of the light mixing plate covering the cavity; however, other color imaging devices capable of viewing the color of the image of the object, or pointing device, rendered from the light mixing plate can be used to determine the location of the object, or pointing device.

When a pointing device (2202A, B, or C), e.g. a finger, stylus or similar device, contacts the surface of the light mixing plate, a portion of light emitted from the plurality of light sources within the cavity of the cursor-maneuvering device produces an brightened image of the of the pointing device (i.e. by reflecting light back to the cavity). The photo sensor (2206) then detects the color hue of this brightened image and monitors the changes of the hue as the pointing device is moved over the surface of the light mixing plate from which the electronic circuitries associated with the image sensor analyzes the color hue and provides control to a cursor on the screen of an portable electronic device, e.g. notebook PC, cellular phone, global positioning system, gaming device, etc. Further, the pointing device can be lifted and reapplied to the light mixing plate's surface to indicate selection of an element on the display of the electronic device. Still further and especially in the case of the notebook PC, multiple fingers (e.g. 2202A, B, and C) can be used in various predetermined locations (relative or absolute) on the light mixing plate's surface to perform functions in addition to cursor movement, such as scrolling, rotating an image or zooming in or out, on the display screen to provide high resolution and sensitivity for accurate positioning of the cursor.

TABLE 1 is an example of a lookup table for the RGB format and the translation of a particular set of colors of the contact area as seen by the image sensor translated into the location of the pointing device on the light mixing plate.

TABLE 1

| Color index value of image sensor | | | Corresponding geographical position on light mixing plate | | |
|---|---|---|---|---|---|
| R1 | G1 | B1 | X1 | Y1 | Z1 |
| R2 | G2 | B2 | X2 | Y2 | Z2 |
| R3 | G3 | B3 | X3 | Y3 | Z3 |

The color index used in Table 1 is not the only usable one. A unique color code can also be created for the other color formats, for example YUV, LAB, CIE, etc. (these are color index values). Thus, by detecting the color of light reflected from a pointing device the image sensor and associated electronic circuits can determine the 3D position and movement of the pointing device and translate the location and movement of the pointing device into 3D location and movement of the cursor on a display associated with the electronic device to which the cursor maneuvering device is connected. Mathematically, one also can derive the (X, Y, Z) data through Eq. (6), in which case there is no need, or a reduced need, for the lookup table (a lookup table would require certain amount of memory).

In essence, it is to be noted that the presently disclosed device (i.e. embodiment 3) enjoys the following advantages.
(1) The reference plane (i.e. Lambertian plate 2203) is a 2D structure endowed with touch sensing capability; there is no need for a pointing device to move in a 3D space in order to acquire a 3D positional data.
(2) The reference plane (i.e. Lambertian plate 2203) is stationary—it suppresses the error caused by human body vibration (which is abundant in magnetic trackers).
(3) The 3D coordinate system constructed by the three-light-source feature of the present disclosure can be mapped to that of the 3D rendering device directly (e.g. point-to-point), making the presently disclosed cursor maneuvering device (3D touch pad) suitable to perspective sketching works.
(4) The presently disclosed invention has very high sensitivity and high resolution, this is largely attributed to the image sensor used (e.g. CMOS image sensor)
(5) Zooming in and out, changing vanishing point, or rotation, like those operations described in embodiment 2, can be done easily. That is, the scale of the coordinate system can be adjusted in a timely fashion either by lighting condition, amplifier gain setup for AD conversion process, or numerical calculation (as Eq (6) does).

Embodiment 4

Embodiment 4 discloses a unique reference surface (e.g., a tinted mouse pad) whose tinting materials are not necessarily in red, blue, or green colors. In fact there are many substances capable of reflecting, refracting, interfering with or photo-emitting electromagnetic waves in a specific wavelength that may not be in the visible range of red, blue, or green. Together they can also form a unique color gamut (e.g., YMC; Yellow, Magenta, and Cyan). There are even extreme cases in which the reference surface reflects or emits electromagnetic waves that are not necessarily in the visible light regime; or, where the electromagnetic waves carry certain identifiable characteristics other than wavelength (e.g., polarization, phase) that can serve instead of wavelength to uniquely characterize absolute position on a reference surface. In nature there are many substances that emit, refract or reflect visible, UV or IR radiation when they are irradiated by corresponding waves. Using the same methods taught by the present disclosure, three light reflecting/refracting ingredients can also form a unique "color" gamut, so that they also can be used to form a reference surface for the presently disclosed 3D navigator to use. Their effect will be equivalent to what was taught by the present disclosure when applied to reflected visible radiation: namely all of the geographical points on said reference surface can provide tri-stimuli indexes that are different from one another and can be combined independently to form a mapping from a 2D surface to a 3D space. From these tri-stimuli index data, one can derive the positional data (X, Y, Z), which is similar to what (Eq. 6) does.

The coloration profile of a reference plane as depicted as above can be somewhat like those of FIGS. 20A through 20E, but different profiles are also allowed (e.g., CIE 1931 YMC, etc.). The fundamental physics is the same—the intensity of radiation reflected from or otherwise emitted by the reference plane by any of several methods including refraction, photo-emission, interference, etc., can be denoted as $I'_x$, $I'_y$, and $I'_z$. What makes the intensities $I'_x$, $I'_y$, and $I'_z$ different from those of FIG. 20A, C, and E is(are) that they may change values along the directions that are necessarily the x, y, or z axes in FIG. 20A–E. In additions, the $I'_x$, $I'_y$, or $I'_z$ in embodiment 4 do not necessarily denote RGB or even any visible light. For example, the device engineer can designate the light source used by embodiment 4 to be UV, IR, etc. In practice, UV light can provide better positional accuracy (i.e., wavelength is shorter), IR sensor can provide better immunity to the noise from room ambient light.

As is understood by a person skilled in the art, the preferred embodiments of the present disclosure are illustrative of the present disclosure rather than being limiting of the present disclosure. Revisions and modifications may be made to methods, processes, materials, structures, and dimensions through which a 3D maneuvering system utilizing both color detection and, optionally, pattern detection on a tinted planar reference surface is made and used, while still providing such methods, processes, materials, structures and dimensions in accord with the present disclosure as defined by the appended claims.

What is claimed is:

1. A maneuvering system comprising:
a two dimensional (2D) planar continuously tinted reference surface, configured to emit electromagnetic radiation when illuminated externally, wherein said electromagnetic radiation is characterized by multiple wavelengths and varying intensities;
wherein said planar continuously tinted reference surface produces a tri-stimuli or tri-color gamut comprising a multiplicity of hues deposited on said tinted reference surface with a pre-determined intensity gradient;
wherein said planar continuously tinted reference surface may also include targetable features thereon; and
a navigational device including a source of illumination and an optoelectronic sensor sensitive to said emitted radiation and configured to move on said continuously tinted planar reference surface and further configured to cause said emission of said multiple wavelengths of radiation at varying intensities by using said source of illumination to illuminate said surface and to create and identify images of said targetable features when said targetable features are present;
wherein said navigational device is configured to receive and process said multiple wavelengths of radiation at varying intensities emitted by said continuously tinted planar reference surface and wherein said navigational device is also configured to simultaneously capture images of said targetable features located thereon when said targetable features are present;
wherein, by sensing and analyzing independent wavelength components or other independent electromagnetic properties of said radiation as a function of their various intensities emitted by said tinted planar reference surface, said navigational device is configured to determine its absolute position on said planar reference surface;
whereby said navigational device determines a continuous mapping from said absolute position on said 2D tinted planar reference surface to a 3D space characterized by a higher dimensional, 3D set of independent position and motion variables;
wherein said navigational device may also be configured to simultaneously determine its motion relative to said surface by an evaluation of relative positional changes of said identifiable features that may be thereon;
whereby, using said absolute position determination and said relative motion determination, said navigational device communicates its motion in a form configured for: 1) generating linear and non-linear portions of the 3D motion of a cursor or of a graphically rendered object, 2) providing corresponding 3D control of an electronic or electromechanical device, 3) activating certain display or control functions.

2. The maneuvering system of claim 1 wherein variable intensities of independent, reflected wavelengths caused by illumination of said tinted planar reference surface by said source of illumination within said navigational device provide an absolute position on said tinted reference surface and whereby said absolute position further provides a continuous mapping from a 2D surface to a 3D space of a three dimensional graphical rendering device or provides 3D control of an electronic or electromechanical device.

3. The maneuvering system of claim 1 wherein said electronic or electromechanical device is a 3D printer.

4. The maneuvering system of claim 1 wherein said electronic or electromechanical device is a device for maneuvering a real physical object.

5. The maneuvering system of claim 1 wherein said emission from said tinted reference surface is caused by reflection or by fluorescence or by other forms of photo-emission or by interference or refraction of incident electromagnetic radiation from said source of illumination, or includes the effects of polarization change or phase change whereby a phase or a polarization of said incident radiation is changed and wherein intensities of said independent emitted radiation having said changed phase or polarization are detected and are converted to a three-dimensional mapping of a two-dimensional absolute position on said tinted reference surface.

6. The maneuvering system of claim 2 wherein said absolute two dimensional location determination provided by said electromagnetic radiation intensity data on said planar reference surface produces three-dimensional x, y and z data for positioning and moving a cursor or other graphically rendered object on a graphic rendering device in a manner that includes effects of non-linear components of said motion of and positioning said cursor or said graphically rendered object on a graphic rendering device and moving said cursor or said graphically rendered object in a three-dimensional manner and with subtlety and nuance provided by said non-linear components.

7. The maneuvering system of claim 1 wherein said reference surface has targetable features thereon and wherein absolute location determination by analysis of color intensities combined with relative motional data obtained by evaluation of said targetable features enables a graphically rendered object to be accurately positioned on a graphic rendering device and rotated through an angle about an axis or graphically rendered with perspective or zoomed in or out.

8. The maneuvering system of claim 1 comprising at least one light source configured to produce light reflection or emission of said multiple wavelengths of light from said tinted planar reference surface.

9. The maneuvering system of claim 8 wherein said at least one light source is a source of light of as many wavelengths as will produce a range of independent wavelengths within the range between IR and UV and including optical radiation to comprise a tri-stimuli gamut.

10. The maneuvering system of claim 1 wherein said tri-color gamut or said tri-stimuli gamut is produced by a distribution of spots of three independently colored dyes or pigments corresponding to said tri-coloration, where said dyes or pigments are blended in such a manner on said surface as to produce a variation of intensities of independent colors along three directions of motion.

11. The maneuvering system of claim 8 wherein said at least one light source is a variable intensity light source configured to illuminate said tinted planar reference surface with variations of said intensity and thereby producing a variation in intensity of any of said multiplicity of wavelengths of said emitted light.

12. The maneuvering system of claim 1 wherein said tinted planar reference surface enables at least one vanishing point to be defined whereby a graphic designer is enabled to produce perspective drawings to be rendered on a computer, a graphical rendering device or to implement an operation of an electronic or electromechanical device to facilitate 3D motions.

13. The maneuvering system of claim 12 wherein changing the intensity of illumination of said tinted planar reference surface enables the motion of a cursor in 3D space to proceed along any of a multiplicity of planes in said space selected by an operator and wherein said any of a multiplicity of planes may be tilted at an angle selected by an operator of said navigational device.

14. The maneuvering system of claim 1 wherein a combination of location determination on said tinted planar reference surface using multiple wavelength intensities from said tinted planar reference surface together with relative motion detection using the relative motion of identifiable targeted topological features on said planar reference surface permits the generation of fully three-dimensional motion including linear and non-linear portions, or of translational motion plus a separate rotational degree of freedom about an axis for use by a three-dimensional graphical rendering system or by an electronic or electromechanical system for facilitating 3D motions of real or virtual objects, using only linear motion of said navigational device along said planar reference surface.

15. The maneuvering system of claim 1 wherein said planar reference surface is reflectively tinted so that each individual position on said surface reflects radiation in a multiplicity of wavelengths, wherein said wavelengths do not interfere with each other and wherein each wavelength is reflected with a different intensity whereby a three-dimensional mapping of said two-dimensional planar reference surface is made onto a three-dimensional graphical rendering system.

16. The maneuvering system of claim 15 wherein said reflected radiation is the reflection of radiation emitted by at least one source of electromagnetic radiation within said navigational device.

17. The maneuvering system of claim 16 wherein said reflected radiation is captured by said navigational device and determines an absolute position of said device on said reference surface.

18. The maneuvering system of claim 1 wherein said planar reference surface is coated with a radiatively emissive coating so that each individual position on said surface emits radiation in a multiplicity of wavelengths and intensities that may be different from radiation emitted by sources within said navigational device, wherein said wavelengths are independent of each other and wherein each wavelength is emitted with a different intensity to produce a profile of wavelengths and their respective intensities to produce a three-dimensional mapping of said planar reference surface onto a three-dimensional graphical imaging system.

19. The maneuvering system of claim 1 wherein said navigational device comprises a body having a cavity opening onto said planar reference surface wherein said cavity further includes a source of illumination by electromagnetic radiation of multiple wavelengths and intensities configured to irradiate said planar reference surface and wherein said navigational device further includes a sensor of such radiation configured to capture independent wavelengths of reflections or other radiative emissions from said planar reference surface caused by said radiation impinging on said planar reference surface.

20. The maneuvering system of claim 19 wherein said planar reference surface is coated with color reflective material to reflect a continuous range of wavelengths and intensities characterized by a tri-color gamut corresponding to any of the appropriate sets of three independent colors.

21. The maneuvering system of claim 20 wherein changing the intensity of one or more of said multiple wavelengths of light of said navigational device while maintaining the intensity of remaining wavelengths causes a cursor or other object to zoom in or out or controls the position of a vanishing point.

22. The maneuvering system of claim 19 wherein said sensor creates a pixillated image frame capable of retaining a succession of images of the illuminated planar reference surface, wherein said images may be constructed of non-interfering reflected or emitted wavelengths of varying intensities from said planar reference surface or, independently, of identifiable topological features on said surface.

23. The maneuvering system of claim 19 wherein said sensor creates a sequence of pixillated image frames retaining a succession of images of the illuminated planar reference surface containing identifiable topological features on said surface and wherein a comparison of said images are used to extract translations and rotations of said navigational device whereby higher order terms (H.O.T) are identified and used to communicate subtle operator movements to said graphical rendering device.

24. The maneuvering system of claim 1 wherein a variation of the intensities of multiple wavelengths of light emitted by said navigational device allows a corresponding variation in a depth value and/or vanishing point of graphical images being rendered on said graphical rendering device.

25. The maneuvering system of claim 1 wherein a resolution and sensitivity are controlled by variations of the hue value of said planar reference surface.

26. The maneuvering system of claim 1 wherein a motional path of said navigational device along said planar reference surface is retraceable as a result of said tinted planar reference surface providing absolute positions of said navigational device.

27. The maneuvering system of claim 1 wherein wavelengths and other optical features of said radiation and their intensities are analyzed by said navigational device using analog circuitry clock-synchronized to optoelectronic image capturing circuitry.

28. The maneuvering system of claim 1 wherein said navigational device uses digital/analog hybrid circuitry to simultaneously capture relative motion of topological features and absolute positions resulting from hue evaluations.

29. The maneuvering system of claim 1 wherein said navigational device is a touch-screen device that comprises a body having an enclosed cavity having bottom and top surfaces, wherein said bottom surface of said cavity includes a plurality of widely separated light sources emitting different wavelengths of light at different intensities towards a top surface of said cavity and wherein a photo-sensor device is disposed between said light sources; wherein said top surface of said cavity is covered by a Lambertian plate having an upper surface and a lower surface; whereby light emitted by said light sources strike said lower surface of said Lambertian plate and are reflected downward in a diffuse manner whereby they impinge on said photo-sensor; wherein finger pressure exerted on said upper surface of said Lambertian plate modifies said downward reflection in a manner that is sensed by said photo-sensor and is transmitted to a graphical rendering device.

30. The maneuvering system of claim 29 wherein a cursor or graphical object displayed on a graphical display device is oriented three-dimensionally by a movement of an operator's finger.

31. The maneuvering system of claim 29 where said operator's finger motion provides an innate relationship between said operator's nuanced gestures and the responses of said cursor.

32. The maneuvering system of claim 1 wherein said tinted planar reference surface is tinted in a manner that provides independent variations of radiation wavelength and intensity along three directions of motion, whereby a mapping of said two-dimensional tinted planar reference surface and a three-dimensional graphical rendering space is obtained.

33. The maneuvering system of claim 28 wherein analog circuitry is used for analysis of electromagnetic radiation from said planar reference surface and wherein digital circuitry is used for analysis of the relative motion of targeted objects on said planar reference surface.

34. The maneuvering system of claim 33 wherein said analog circuitry compares multiple sets of hue intensity data and wherein said analog comparison provides a direction of motion or a displacement value for a cursor or graphically rendered object represented in a three dimensional coordinate system.

35. The maneuvering system of claim 24 wherein said depth values may be varied in such a way as to create a vanishing point at infinity and thereby to permit an operator to make full use of perspective in creating realistic three dimensional renderings.

36. The maneuvering system of claim 1 wherein, using only said absolute two dimensional motion and location determination provided by said electromagnetic wave intensity data on said planar reference surface and not using the relative motion of targetable features, three-dimensional x, y and z data is produced for positioning and moving a cursor or other graphically rendered object on a graphic rendering device in a manner that includes rotational and translational components of said motion of and positioning said cursor or said graphically rendered object on a graphic rendering device and moving said cursor or said graphically rendered object in a three-dimensional manner.

37. A three dimensional (3D) maneuvering device configured to generate a three dimensional mapping of a two dimensional surface, comprising an optoelectronic sensor configured for capturing images produced by electromagnetic radiation reflected or re-emitted from said two dimensional surface and a source for illuminating said two dimensional surface with said electromagnetic radiation at a multiplicity of wavelengths and with a variable intensity for each of said multiplicity of wavelengths and wherein said electromagnetic radiation is further characterized by variable polarization and phase; wherein, by simultaneously capturing two images, said device acquires both a first set of data which is configured for measuring a displacement and a second set of data which is configured for the detection of motion having a linear and a non-linear part and wherein, by maintaining a sensitivity and resolution of said optoelectronic sensor for said displacement measurement while said source of electromagnetic radiation varies said intensity, polarization and phase of said electromagnetic radiation, said non-linear part of said motion is determined.

38. A three-dimensional (3D) maneuvering device comprising:
a device configured for moving on a planar reference surface and for mapping its two-dimensional motion into a three-dimensional display space, said device including a source of electromagnetic radiation for illuminating said planar reference surface while said device moves thereon and an optoelectronic sensor for capturing, images or other analog motional or positional data from said planar reference surface while said device moves thereon; wherein
while said images or other data are being captured, as a result of said illumination said planar reference surface emits a plurality of electromagnetic waves caused by reflection, refraction, interference, photo-emission, fluorescence, and characterized by different intensities, wavelengths, polarizations, phases, wherein;
said emissions vary along a trajectory on said planar reference surface having a predetermined profile thereon characterized by a fixed or changeable mathematical function or a set of parameters, wherein said emissions are captured by said optoelectronic sensor and said function or parameters characterizing said emissions are recognizable by said device or by electronic links to said device; whereby when said mathematical function is fixed, said motional or positional data along said trajectory is associated by said device with a specific geometrical pattern in three-dimensional space; and when said mathematical function is changed, said trajectory produces a different set of data and a different geometrical pattern in three-dimensional space will then be associated with said data.

* * * * *